(12) United States Patent
May

(10) Patent No.: US 11,488,393 B2
(45) Date of Patent: Nov. 1, 2022

(54) SYSTEMS AND METHODS FOR MOVING OBJECT PREDICTIVE LOCATING, REPORTING, AND ALERTING

(71) Applicant: AWARE Technologies, San Diego, CA (US)

(72) Inventor: Joshua May, Twin Peaks, CA (US)

(*) Notice: Subject to any disclaimer, the term of this patent is extended or adjusted under 35 U.S.C. 154(b) by 221 days.

(21) Appl. No.: 16/189,938

(22) Filed: Nov. 13, 2018

(65) Prior Publication Data
US 2019/0147260 A1 May 16, 2019

Related U.S. Application Data

(60) Provisional application No. 62/585,776, filed on Nov. 14, 2017.

(51) Int. Cl.
| | |
|---|---|
| *G06V 20/58* | (2022.01) |
| *G06K 9/62* | (2022.01) |
| *G06V 20/62* | (2022.01) |
| *G06V 30/10* | (2022.01) |
| *B60W 50/14* | (2020.01) |

(52) U.S. Cl.
CPC ........... *G06V 20/584* (2022.01); *B60W 50/14* (2013.01); *G06K 9/6288* (2013.01); *B60W 2050/143* (2013.01); *B60W 2050/146* (2013.01); *G06V 20/625* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 5,935,190 A | 8/1999 | Davis et al. | |
| 9,573,592 B2* | 2/2017 | Prokhorov | ........... G05D 1/0214 |
| 10,493,996 B2* | 12/2019 | Phillips | ................. G07C 5/008 |
| 10,496,091 B1* | 12/2019 | Ross | ....................... G06N 5/04 |

(Continued)

FOREIGN PATENT DOCUMENTS

WO    WO2019099413 A1    5/2019

OTHER PUBLICATIONS

"International Search Report" and "Written Opinion of the International Searching Authority," Patent Cooperation Treaty Application No. PCT/US2018/060852, dated Jan. 24, 2019, 8 pages.

*Primary Examiner* — Nancy Bitar
(74) *Attorney, Agent, or Firm* — Kirk A. Buhler; Buhler & Associates Patenting

(57) ABSTRACT

Systems and corresponding methods are provided for moving object predictive locating, reporting, and alerting. An exemplary method includes receiving moving object data corresponding to a moving object; receiving sensor data from a sensor; merging the received moving object data and received sensor data into a set of merged data; and based thereon, automatically determining one or more of: a predicted location or range of locations for the moving object, a potential path of travel or area for the moving object, and a potential for interaction between the moving object and subject objects. The method can include automatically generating and providing alerts based on the determining. Alert can be configured for users having potential for interaction with the moving object. A method may include receiving sensor data from third parties, and provide information generated by the system pertaining to moving objects to other third parties.

17 Claims, 25 Drawing Sheets

(56) References Cited

U.S. PATENT DOCUMENTS

| | | | |
|---|---|---|---|
| 10,650,621 B1* | 5/2020 | King | H04L 67/12 |
| 11,250,695 B2* | 2/2022 | Mielenz | G08G 1/164 |
| 2009/0160678 A1* | 6/2009 | Turnbull | B60Q 5/006 |
| | | | 340/944 |
| 2013/0197736 A1 | 8/2013 | Zhu et al. | |
| 2014/0012494 A1* | 1/2014 | Cudak | G01C 21/3415 |
| | | | 701/465 |
| 2015/0228188 A1 | 8/2015 | Macfarlane et al. | |
| 2016/0140614 A1* | 5/2016 | Brubaker | G06Q 30/0269 |
| | | | 705/14.62 |
| 2016/0176397 A1* | 6/2016 | Prokhorov | B60W 60/0015 |
| | | | 701/25 |
| 2017/0076595 A1 | 3/2017 | Macfarlane et al. | |
| 2017/0106876 A1* | 4/2017 | Gordon | B60W 50/082 |
| 2017/0197617 A1* | 7/2017 | Penilla | G08G 1/163 |
| 2017/0369055 A1* | 12/2017 | Saigusa | G08G 1/0141 |

* cited by examiner

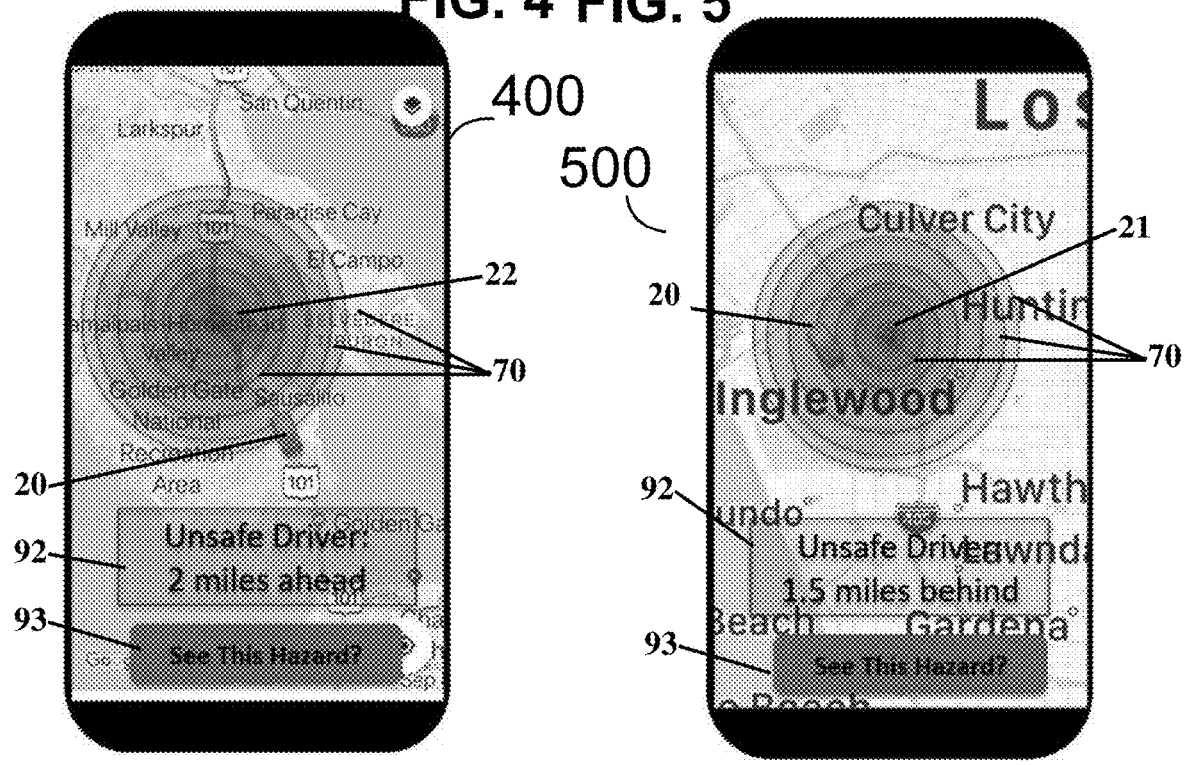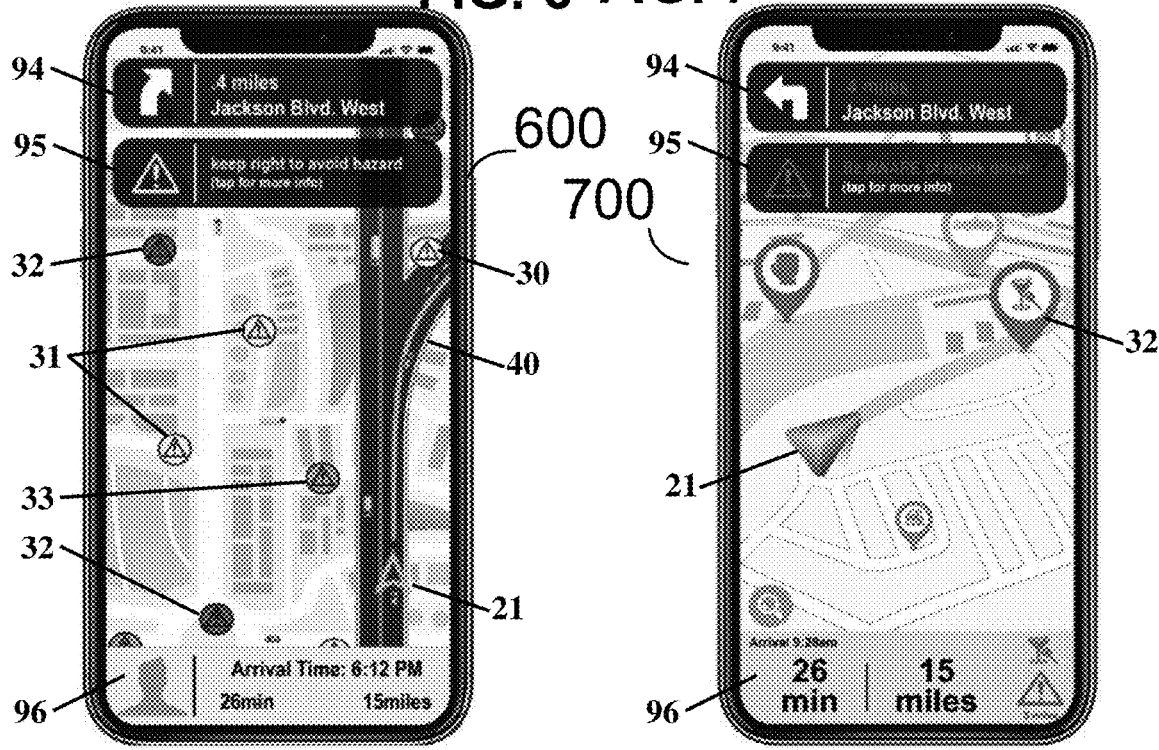

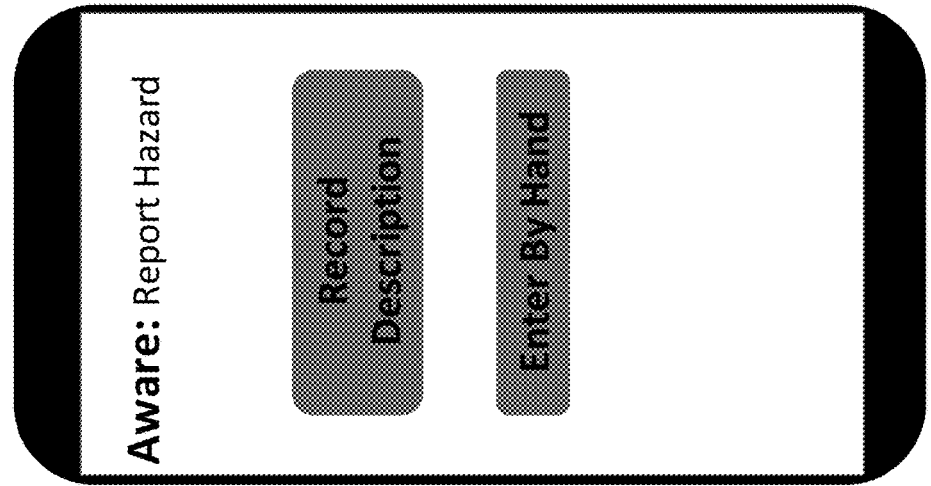
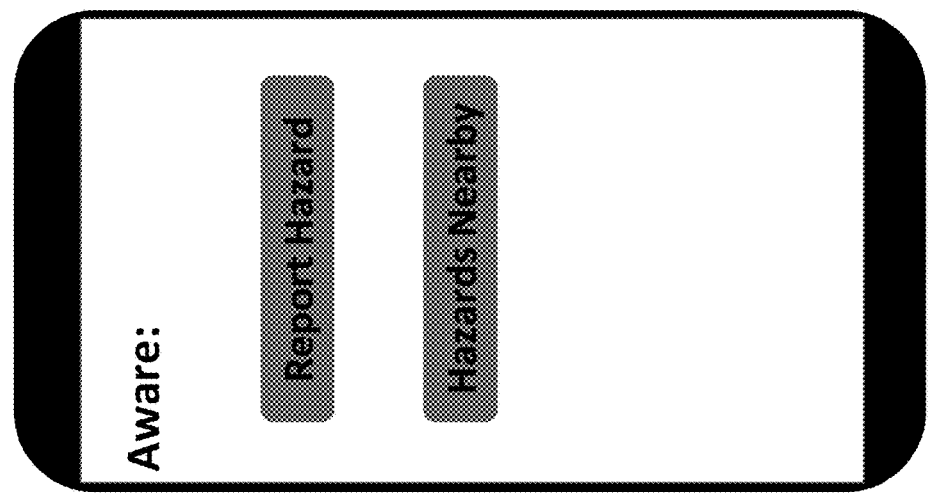
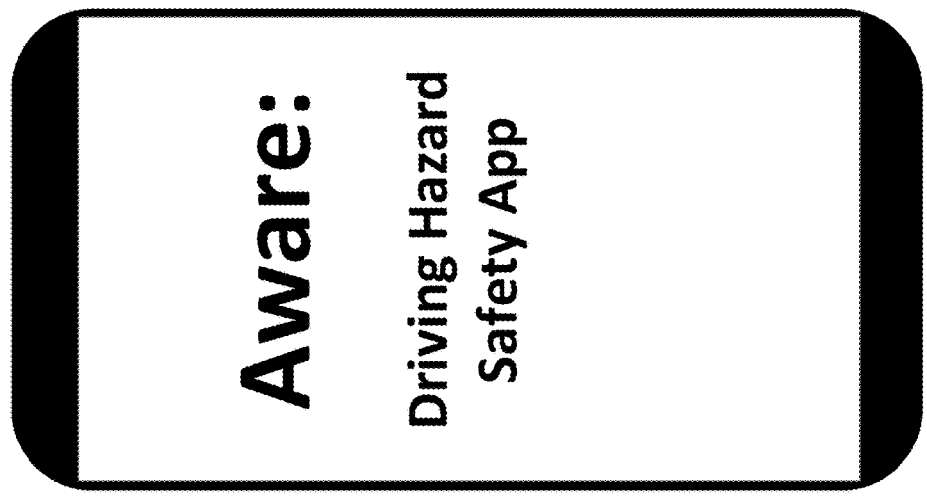
FIG. 9 (three screens shots)

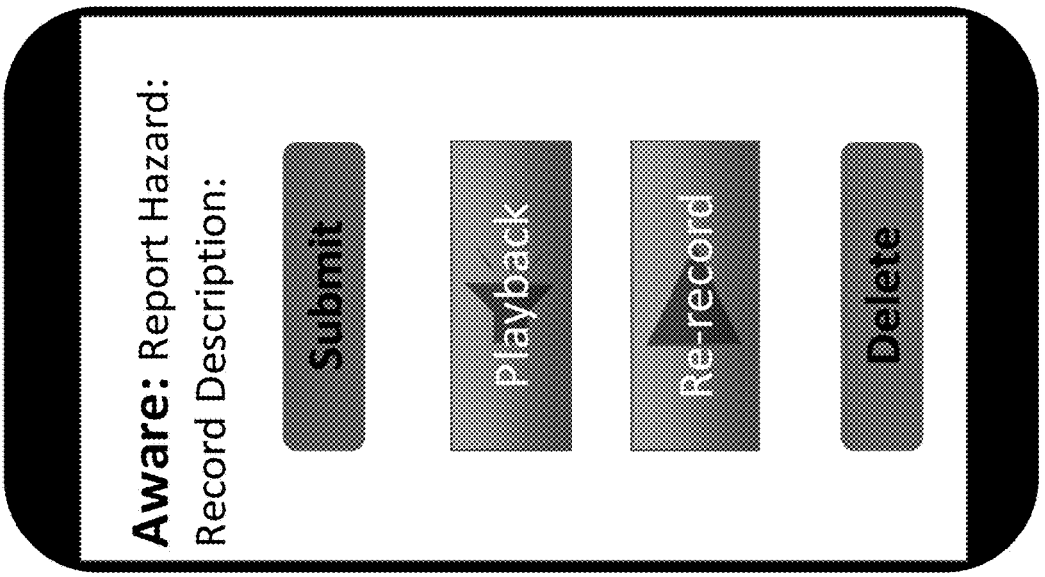
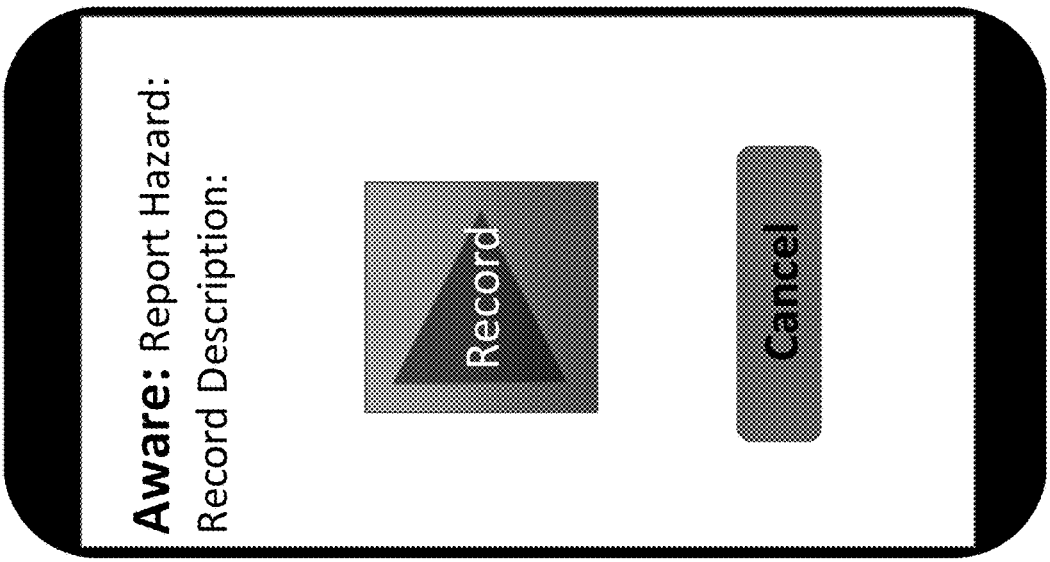
FIG. 10 (two screens shots)

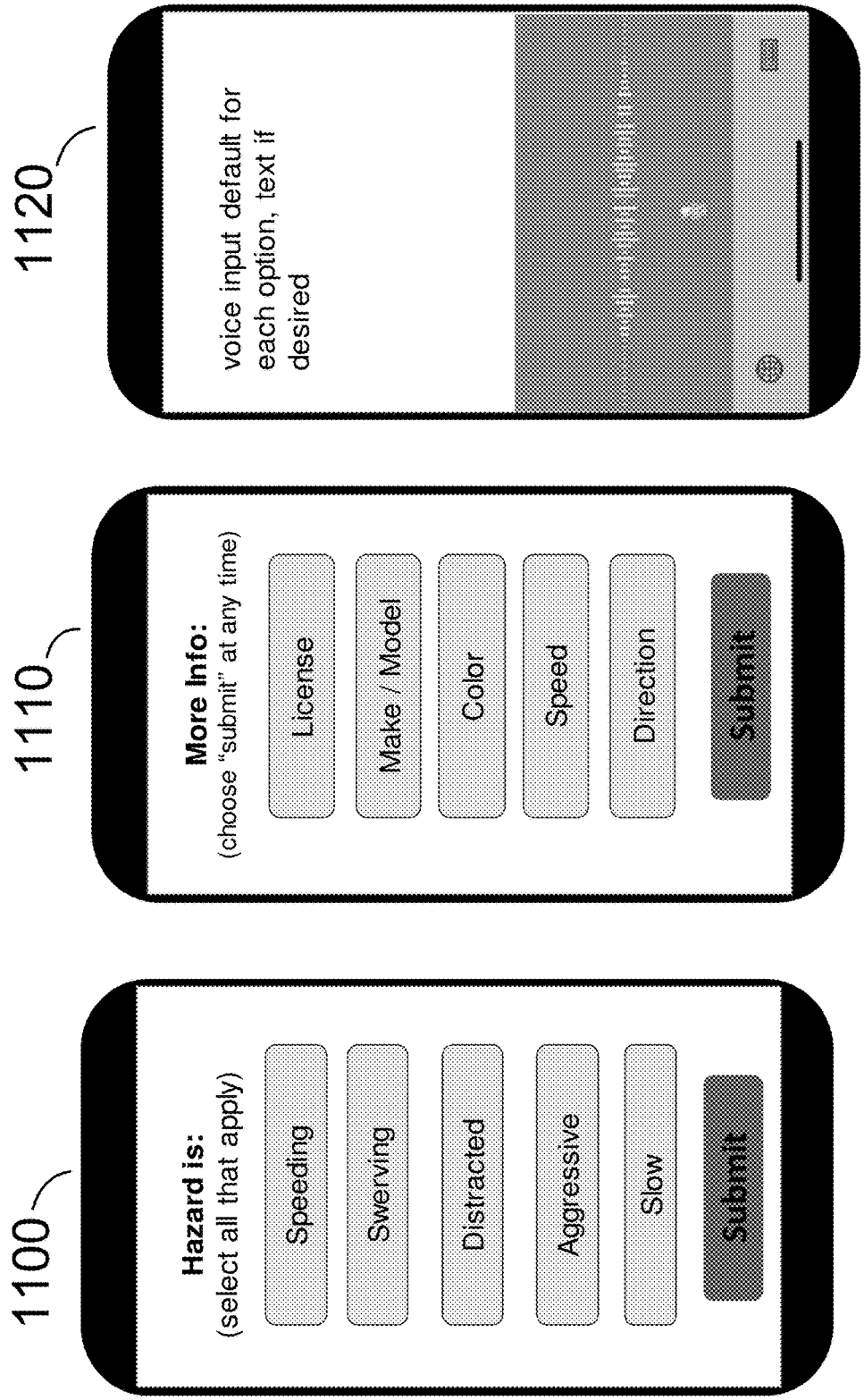
FIG. 11 (three screens shots)

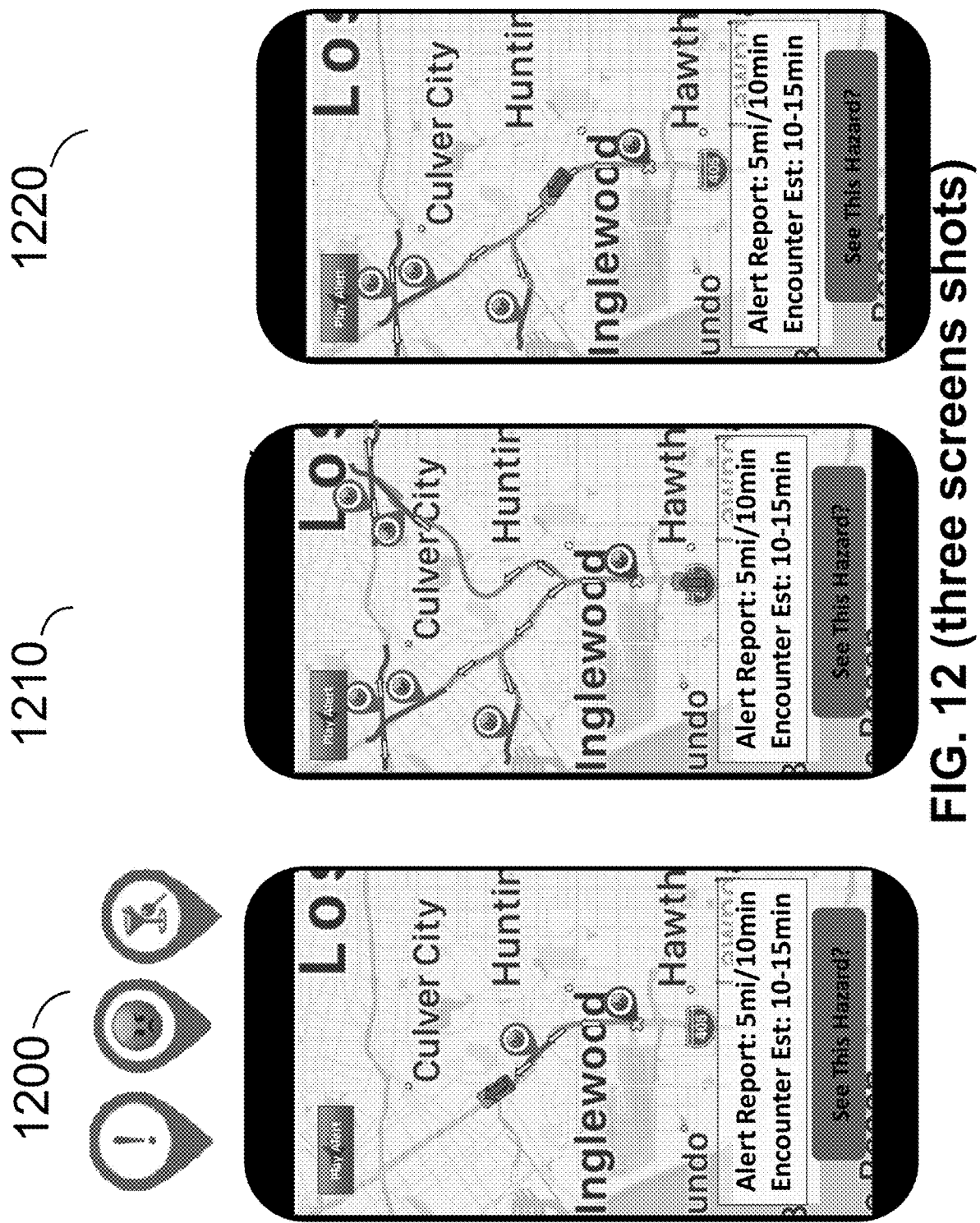
FIG. 12 (three screens shots)

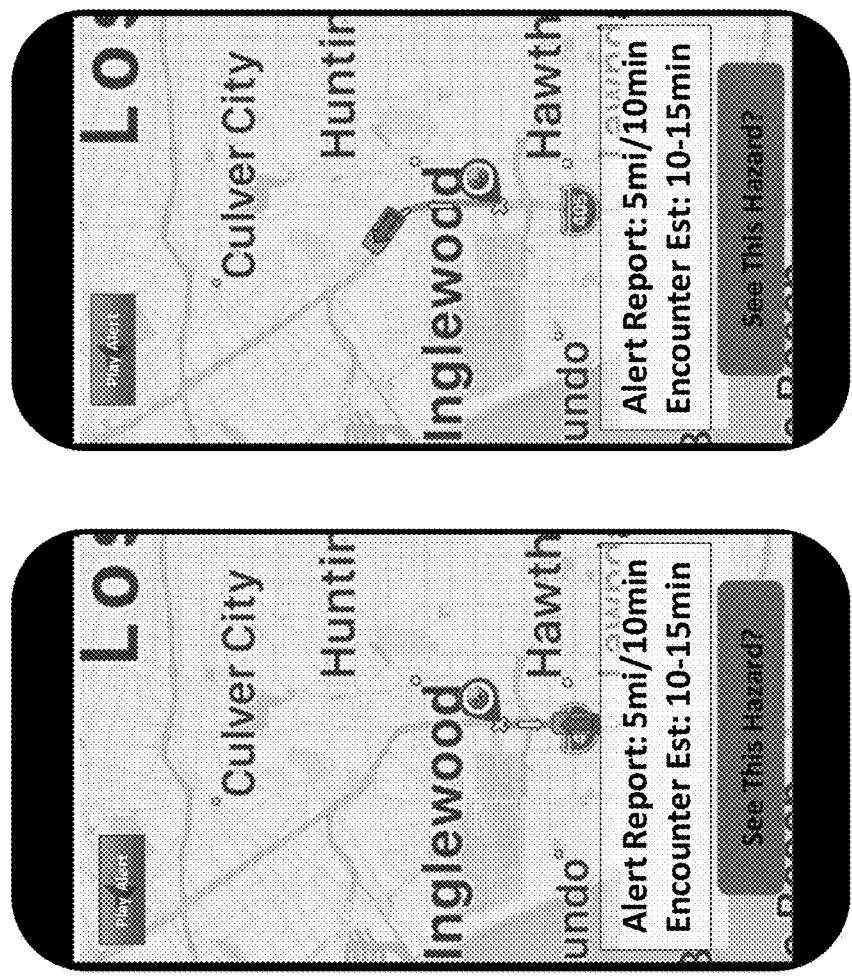
FIG. 13 (two screens shots)

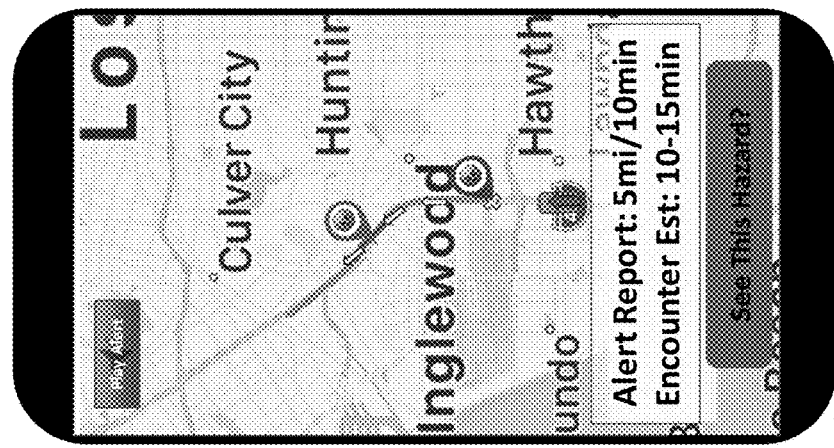
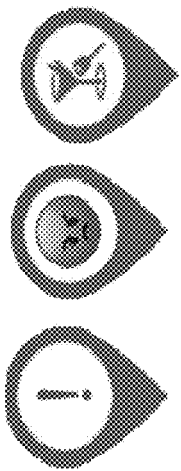
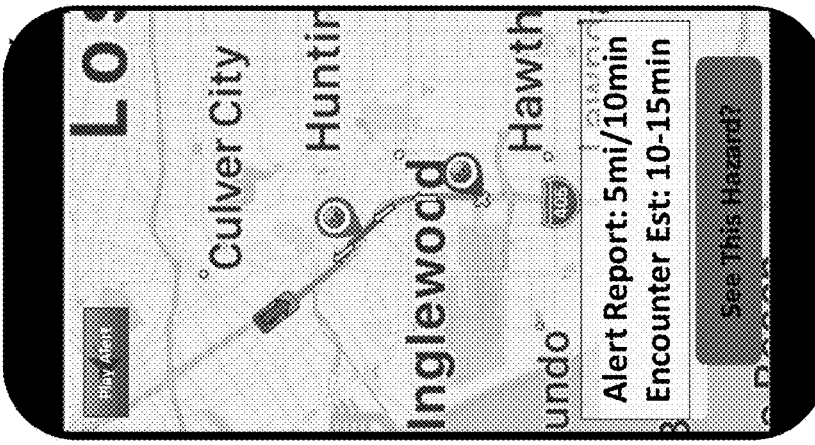
FIG. 14 (two screens shots)

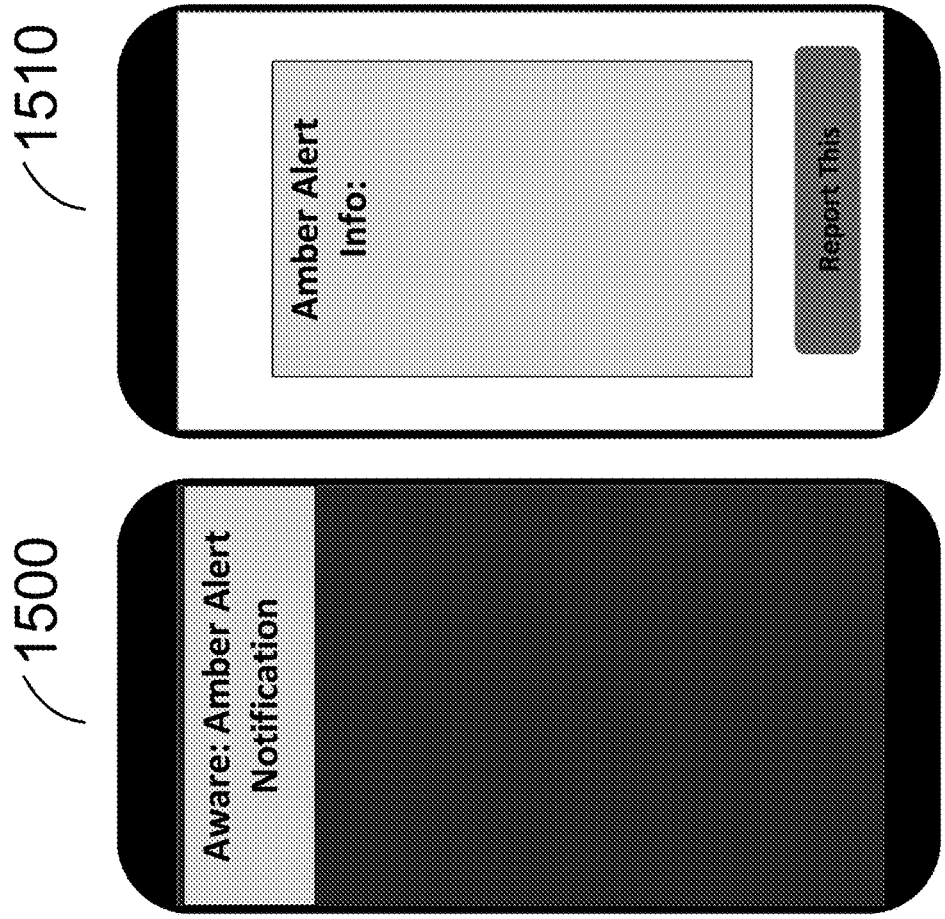
FIG. 15 (two screens shots)

1600

```
┌─────────────────────────────────────────────────────┐
│  Providing a user interface to a user for information │
│              entry on a device.                      │
│                    1602                              │
└─────────────────────────────────────────────────────┘
                        ▼
┌─────────────────────────────────────────────────────┐
│     Receiving moving object data corresponding       │
│              to a moving object.                     │
│                    1604                              │
└─────────────────────────────────────────────────────┘
                        ▼
┌─────────────────────────────────────────────────────┐
│          Receiving sensor data from a sensor.        │
│                    1606                              │
└─────────────────────────────────────────────────────┘
                        ▼
┌─────────────────────────────────────────────────────┐
│ Merging the received moving object data and the received │
│        sensor data into a set of merged data.        │
│                    1608                              │
└─────────────────────────────────────────────────────┘
                        ▼
┌─────────────────────────────────────────────────────┐
│ Based on the merged data set, automatically determining │
│ one or more of: a predicted location for the moving object, │
│    a potential path of travel for the moving object, a   │
│    potential for interaction between the moving object and │
│  one or more other objects, and an alert concerning the  │
│                 moving object.                       │
│                    1610                              │
└─────────────────────────────────────────────────────┘
                        ▼
┌─────────────────────────────────────────────────────┐
│                 Providing the alert.                 │
│                    1612                              │
└─────────────────────────────────────────────────────┘
```

SYSTEMS AND METHODS FOR MOVING OBJECT PREDICTIVE LOCATING, REPORTING, AND ALERTING

CROSS REFERENCE TO RELATED APPLICATIONS

This application claims the benefit of U.S. Provisional Application Ser. No. 62/585,776, filed Nov. 14, 2017, which is hereby incorporated by reference herein in its entirety, including all references cited therein.

FIELD

The present technology pertains in general to objects of many types, more specifically, to moving object determination, reporting, predicting, and/or alerting.

SUMMARY

This summary is provided to introduce a selection of concepts in a simplified form that are further described in the Detailed Description below. This summary is not intended to identify key or essential features of the claimed subject matter, nor is it intended to be used as an aid in determining the scope of the claimed subject matter.

The present disclosure provides various embodiments of systems and methods for moving object predictive locating, reporting, and alerting, described herein. For one example, the present technology may be embodied as an application (i.e., an "app") where the application can project the potential current and future paths and locations of objects and notify individuals and other systems that may be impacted, or that are interested in obtaining this information, as detailed further herein. The moving objects can be, but are not limited to, moving hazards.

In various embodiments, the method includes receiving moving object data corresponding to a moving object; receiving sensor data from at least one sensor; merging the received moving object data and the received sensor data into a set of merged data; based on the set of merged data, automatically determining one or more of: a predicted location or range of locations for the moving object, and a potential path of travel for the moving object, and an alert concerning the moving object; and providing the at least one alert. The method may further include, based on the set of merged data, automatically determining a potential for interaction between the moving object and one or more other objects.

In other embodiments, the method includes identifying a specific type for the moving object; receiving historical traits and trends associated with the moving object, including statistical movement characteristics of the object, the statistical movement characteristics including acceleration and speed ability of the identified object; and adjusting the maximum acceleration, maximum speed, and maximum reachable range for the object as a function of geographic mediums that the object will move through in time over the projected course and trajectory of the object. In some embodiments, the method considers average speeds a particular vehicle make/model/individual drives on a particular type of roadway.

In some embodiments, the present technology is a system that provides a service where inputs are received from third parties and outputs are provided to those or to other third parties. Inputs could include all types of sensor data pertaining to users and moving objects (e.g., that could be classified as hazards), and outputs provided could be a merged data set as well as additional information generated by the system pertaining to approximation and estimation of future location, proximity, trajectory and routing.

Many advantages provided by the present technology are described herein. Some of those advantages include but are not limited to enabling people to quickly and easily report moving objects of concern or interest; enable reports to be generated quickly and safely by users in a hands-free mode; immediately notify users on system of objects in the vicinity and generally; predict object locations and display with an estimated encounter time as available and beneficial; alert users with additional updates as object data is updated; provide segmenting of objects by or into categories; provide users and other sources with the option to include audio, video and photos as part of reports; provide for transmitting appropriate information to law enforcement; enable voice reports from the user to include in-depth information; parse audio and video reports using machine learning or other types of artificial intelligence (AI) separately or together with human monitors; and not disturbing or alerting users outside the object range. In some embodiments, automated sensors report objects or information or data about the objects, where the automated sensors could be traffic cameras; sensors mounted to other vehicles, e.g., autonomous vehicles; as reported by others and agencies, e.g., law enforcement, 911 operators, Amber Alerts; etc.

Machine learning and other types of AI may utilize statistical and other techniques for learning patterns, etc. from historical and present data, to make various predictions with probabilities herein, for example, for all or one or more of: predicting a location for the moving object, at least one potential path of travel for the moving object, a potential for interaction between the first user and the moving object, and/or for determining whether to send at least one alert concerning the moving object.

BRIEF DESCRIPTION OF THE DRAWINGS

Embodiments are illustrated by way of example, and not by limitation, in the figures of the accompanying drawings, in which like references indicate similar elements and in which:

FIG. 4 illustrates an example screen that can be presented to a user in response to determining an unsafe driver is located, moving, and ahead of the user, according to an example embodiment.

FIG. 5 illustrates an example screen that can be presented to a user in response to determining that an unsafe driver in a subject vehicle is located, moving, and is presently behind the user or driver, according to an example embodiment.

FIG. 6 illustrates an example screen presented to a user in response to determining that a user is approaching a moving object, according to an example embodiment.

FIG. 7 illustrates an example screen presented to a user to route around a potential object in response to determining that the potential object was in the route the user had been taking, according to an example embodiment.

FIG. 9 illustrates example entry screens for an application, according to other embodiments.

FIG. 10 illustrates an example screen providing a user interface to record a description for reporting a moving object, according to various embodiments.

FIG. 11 illustrates an example screen providing a user interface for a text input method for reporting a moving object, according to various embodiments.

FIG. 12 illustrates three example screens for alerts provided to the user overlaid on a map, according to an example embodiment.

FIG. 13 illustrates screen shots, according to some embodiments.

FIG. 14 illustrates screen shots, according to some embodiments.

FIG. 15 illustrates two example screens and for providing amber alerts notification and information to a user, according to an example embodiment.

FIG. 16 is a block diagram of an operational flow chart of a method, according to an example embodiment.

DETAILED DESCRIPTION

Figure 1:
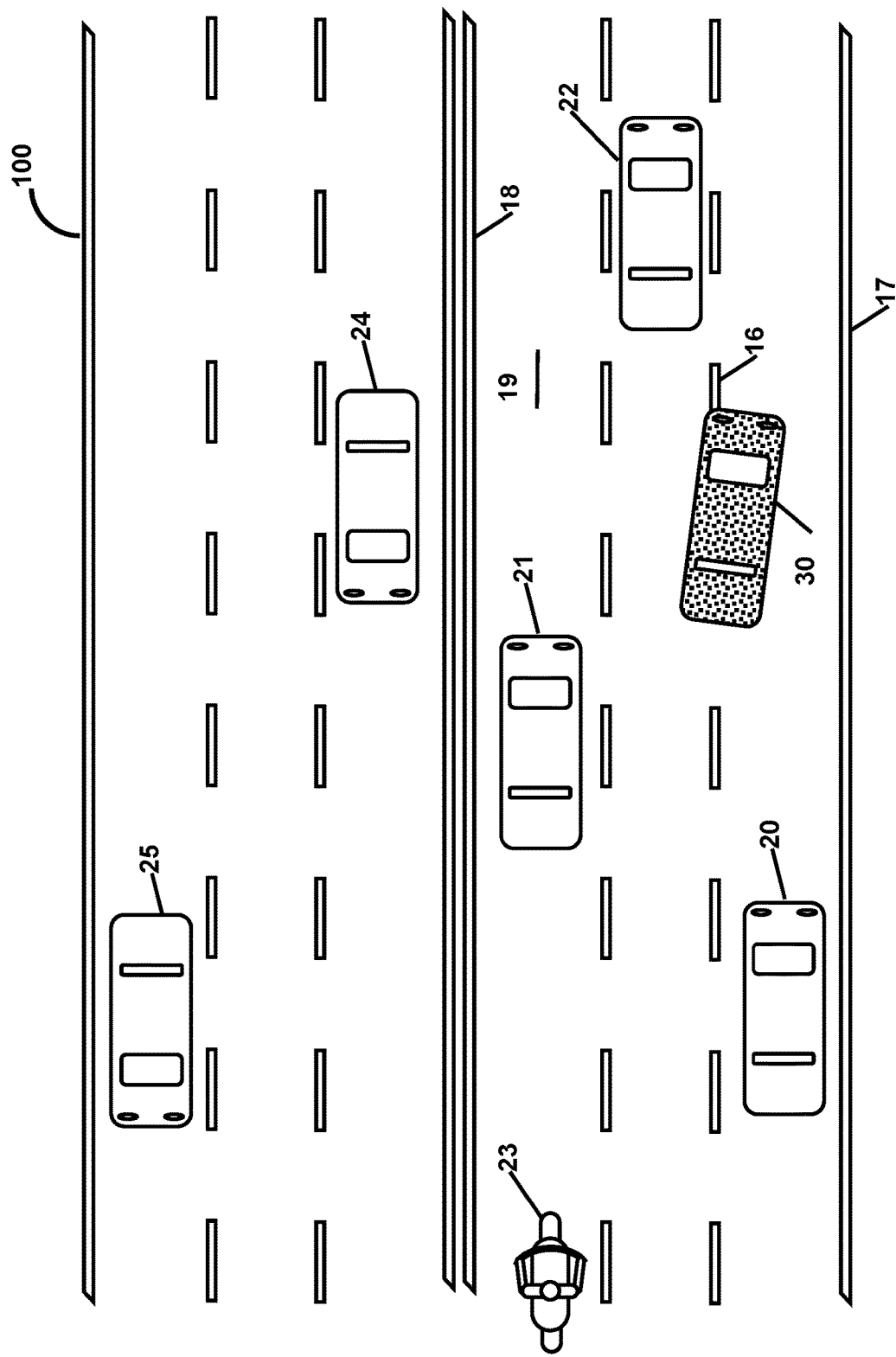
FIG. 1 illustrates an example plan view of a freeway with a moving vehicle type hazard and other vehicles, according to an example embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Tracking and alerting drivers to traffic accidents, road construction, police presence, and stationary, fixed objects is used to guide drivers to the most time efficient route to get to their destination. Moving hazards present particularly difficult problems for tracking and alerting.

It should be appreciated that the present technology is not limited to the objects being hazards; other objects may be moving and processed to the present technology. In addition, although some examples herein are described with respect to moving hazards that a driver could encounter on the road, the present technology is not limited to that type of moving hazards.

Studies have shown that excess drinking and driving can be a deadly combination and cost us an estimated to be $37 billion per year. The statistics are staggering: one in three accidents involve an alcohol-impaired driver; between midnight and 3 a.m., drunk driving crashes kill someone every 23 minutes; in 2010, 10,228 people died in alcohol-impaired driving crashes (one every 51 minutes); the most frequently recorded blood alcohol content (BAC) level in fatal crashes was 0.17 which is more than twice the legal limit; and every day 29 people are killed in drunk driving crashes and 1,440 people are injured. Clearly, there is a need to address the hazard of drunk drivers.

The objects that might be encountered include but are not limited to drunk or otherwise impaired drivers, texting drivers, kidnappers of missing children (e.g., "Amber" alert), battlefield objects, hiking encounters (e.g. predatory animals), in flight obstacles and hazards, maritime obstacles and hazards, and underwater dangers, to name just several possibilities.

Various embodiments of the present technology provide systems and methods for moving object predictive locating, reporting, and alerting, described herein. For one example, the present technology in some embodiments may be embodied as an application where the application can project the potential current and future paths and locations of objects, an individual, group of individuals, vehicle, group of vehicles (to name some non-limiting examples), and notify individuals and other systems that may be impacted, or that are interested in obtaining this information. In another embodiment, the present technology can be utilized via a web browser, a corporate network server, the cloud, etc. The present technology can also be configured to provide graphics in three dimensions and/or configured for virtual reality or augmented reality interaction.

FIG. 1 is an example plan view of an area 100 that includes a freeway 19 with a moving object being in this example a moving vehicle type hazard 30. FIG. 1 also shows on freeway 19 other vehicles in the vicinity of the hazard identified according to an example embodiment. In the example in FIG. 1, the freeway 19 is a divided roadway with three lanes 16 of traffic in each direction of travel and a shoulder 17. In this example, a primary user 20 observes a subject vehicle 30 which may be variously a slow vehicle, a weaving vehicle, a wrong way vehicle, a vehicle driven on the shoulder, etc. The subject vehicle 30 can potentially cause harm to the primary user 20 and potentially to other vehicle.

In assessing the threat posed by the subject vehicle, various embodiment consider several indicia for drunk drivers may include, quick acceleration or decelerations; swerving, weaving, or zig-zagging across the road; stopping or turning abruptly or illegally; nearly hitting an object like a curb or another vehicle; drifting in and out of lanes or straddling multiple lanes; driving slower than 10 miles per hour below the speed limit; driving with headlights off at night; and driving on the wrong side of the road or anywhere that is not on the road; to name several non-limiting examples. Such indicia are weighted in determining the priority of a moving object that may be a potential hazard. For example, determining that the subject vehicle nearly hits an object on the road may be higher priority and hence given more weighting than quick acceleration. Similarly, determining that the subject vehicle is driving on the wrong side of the road is much higher priority and thus weighted more than either determining the subject vehicle is accelerating. Moreover, if the subject vehicle is driving on the wrong side of the road and is driving on the side of the road of the user, it will be given much higher priority and thus more weight than if the user was driving on the opposite side of the road from the subject vehicle. Similarly, the number of confirming reports from additional users or sensors can increase the priority and weight for determining the potential hazard and potential interaction with the hazard. In addition, if a moving object is a hazard and is identified and reported by multiple observers or sensors it can then be confirmed with increasing likelihood and as a high-level priority. For example if ten users of the technology report a wrong way driver within ten minutes within a twenty mile stretch of road then the priority/weighting of the hazard could then increase.

It may be determined in various embodiments that in addition to the primary user 20, the driver 21 and the driver 22 are also in imminent danger from the subject vehicle 30, but other vehicles in the vicinity may not be. It should be appreciated that objects such as vehicles shown in FIG. 1 are identified by their occupant driver; however, certain vehicles could be autonomous self-driving vehicles having no or some passengers therein.

In the example in FIG. 1, the motorcycle 23 may be far enough in back of the subject vehicle 30 that the rider of motorcycle 23 should be able to presently observe the subject vehicle 30, not be in immediate peril, but might be imperiled in the future. Driver 24 and driver 25 are traveling in an opposite direction and should not be affected by the unsafe actions of the subject vehicle 30, unless on an undivided roadway, or the subject vehicle 30 changed directions and veered over the divider 18, for example. Driver 22 is ahead of the subject vehicle 30 and may not be aware of the subject vehicle 30, but if the subject vehicle 30 was speeding, an accident could still occur between the subject vehicle 30 and driver 22.

Figure 2:
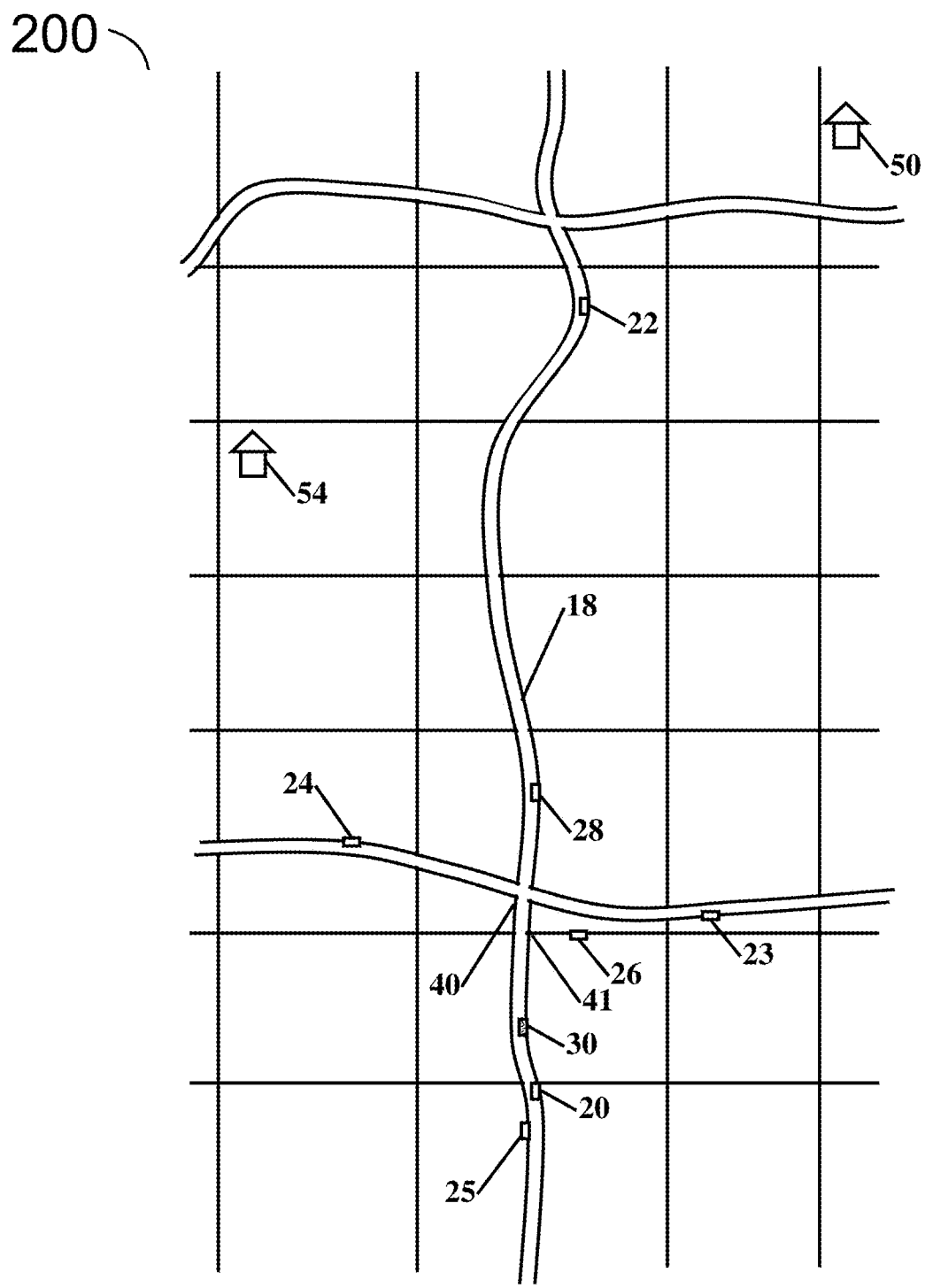
FIG. 2 illustrates a plan view of an area that includes a freeway along with a street map/grid with adjacent roads and freeway portions, according to an example embodiment.

FIG. 2 shows a plan view of an area 200 that includes a freeway 18 along with a street map/grid with adjacent roads and freeway portions, according to an example embodiment.

In this example, the subject vehicle 30 has been observed by the primary observer 20. In operation for this example, the primary observer 30 would activate the application that runs in accordance with various embodiments of the methods of the present technology. The primary observer can then enter or select relevant information about the subject vehicle 30 such as, but not limited to, the speed, direction of travel and type of subject vehicle 30 and optionally the license plate of the subject vehicle 30.

In response to the entry/selection, the method can notify other drivers that could be affected by the object, i.e., subject vehicle 30 in this example. The notification can be based upon various factors which may include the proximity to the subject vehicle 30 and the type or categorization of subject vehicle 30. In the example in FIG. 2, the direction of travel of the subject vehicle 30 is approaching an off-ramp 41 and an interchange 40. In various embodiments, a moving visual representation of this is displayed on the screen for the user, e.g., the primary observer 20 or others. The representation and various embodiments may run variously on a mobile device, a device built into the vehicle, or some Internet of Things (IoT) device, etc. Based on the speed that is determined for the subject vehicle and the user, e.g., primary observer 20, various trajectory information can be updated. The speed may be determined by various means, including but not limited to entry or selection by a user, or sensor data where the sensor may be on a vehicle, on the mobile device, or some other device. In various embodiments, all known routes that could be potentially traversed by the subject vehicle 30 and the user, primary observer 20 for instance, can be highlighted on the display in a color and appearance can be set based upon a selectable range and specification of the notifying application.

In the example in FIG. 2, based upon the present direction of travel, if the subject vehicle 30 is speeding, the subject vehicle 30 can potentially rapidly approach drivers 28, 23, and 24 on the freeway 18 and a driver 26 on a side street. Driver 25 is heading in an opposite direction (see FIG. 1) and so would not require notification in various embodiments. The proximity of driver 22 is more distant from the object (e.g., subject vehicle 30), but a potential for danger from this object still exists. Various embodiments consider the speed, routes, direction, and proximity among the various factors. In addition, another factor would be whether the subject vehicle 30 was a drunk driver or a slow driver. In this example, the potential of affecting driver 22 may be very remote based on the distance from the subject vehicle 30. As the subject vehicle 30 passes the interchange 40, various embodiments would no longer notify any of the user/drivers who are no longer in the direction of travel or immediate area of concern. However, subject vehicles or other objects can be monitored by more than one sensor, sensor location, or reporting observer, and hazardous conditions and changes in subject trajectory and speed can be reported and updated by the system, providing updates to the alerted users, newly alerted users, and subscribers to the system.

In some embodiments, the primary observer 20 can enter a vehicle license plate or the primary observer 20's vehicle or device may be equipped with sensor(s) such as, but not limited to, a camera that could detect the subject vehicle 30's license plate, in addition to other automated ways of identifying subject vehicle 30's unique and semi-unique characteristics. In response to determining the vehicle license plate and other characteristics by whatever means, various embodiment utilize the vehicle license plate to obtain data which would provide a potential destination to use to map the subject vehicle 30 to the subject vehicle 30's home or work 50. If the projected travel path from the subject vehicle 30 to the home or work 50 of the subject vehicle 30 if known (based on vehicle license plate databases, etc.), and based on other methods of determining subject vehicle 30's route or destination, vehicles that are less likely to be affected by this projected travel path, such as vehicles 24 and 26, might not be notified (alerted) since it can be determined by the method that these vehicles may likely not be affected by the subject vehicle 30. In addition, in some embodiments, if the home or work location 54, or other destination or route, of the driver 24 is known, the potential of interaction between driver 24 and the subject vehicle 30 may be unlikely because driver 24 will soon exit the freeway as he or she progresses home. Thus, some embodiments can reduce excessive false warnings, e.g., by filtering based on the likelihood of an interaction in the foreseeable future.

In the example of FIG. 2, as the subject vehicle 30 passes driver 28, various embodiment allow the driver 28 (or other sensors able to identify subject vehicle 30) to update system data regarding the subject vehicle 30, e.g., regarding location. For example, based upon an updated location of the subject vehicle 30 being just past the driver 28, various embodiments determine that the need to notify driver 22 (ahead in the travel path) increases, while it may also be determined that the risk to drivers 23, 24 and 26 is virtually eliminated. The probabilities associated with the risk may be calculated by various embodiments based on the factors mentioned above and below.

Continuing with the vehicle hazard example, the method according to various embodiments of the present technology may be configured to run as an application ("app") on a device.

Although apps and various other aspects may be described in examples with reference to a mobile device, other devices including those built into the vehicle or other object, or IoT devices of some kind, to name a few non-limiting examples, may also be used to practice the present technology according to some embodiments.

Figure 3:
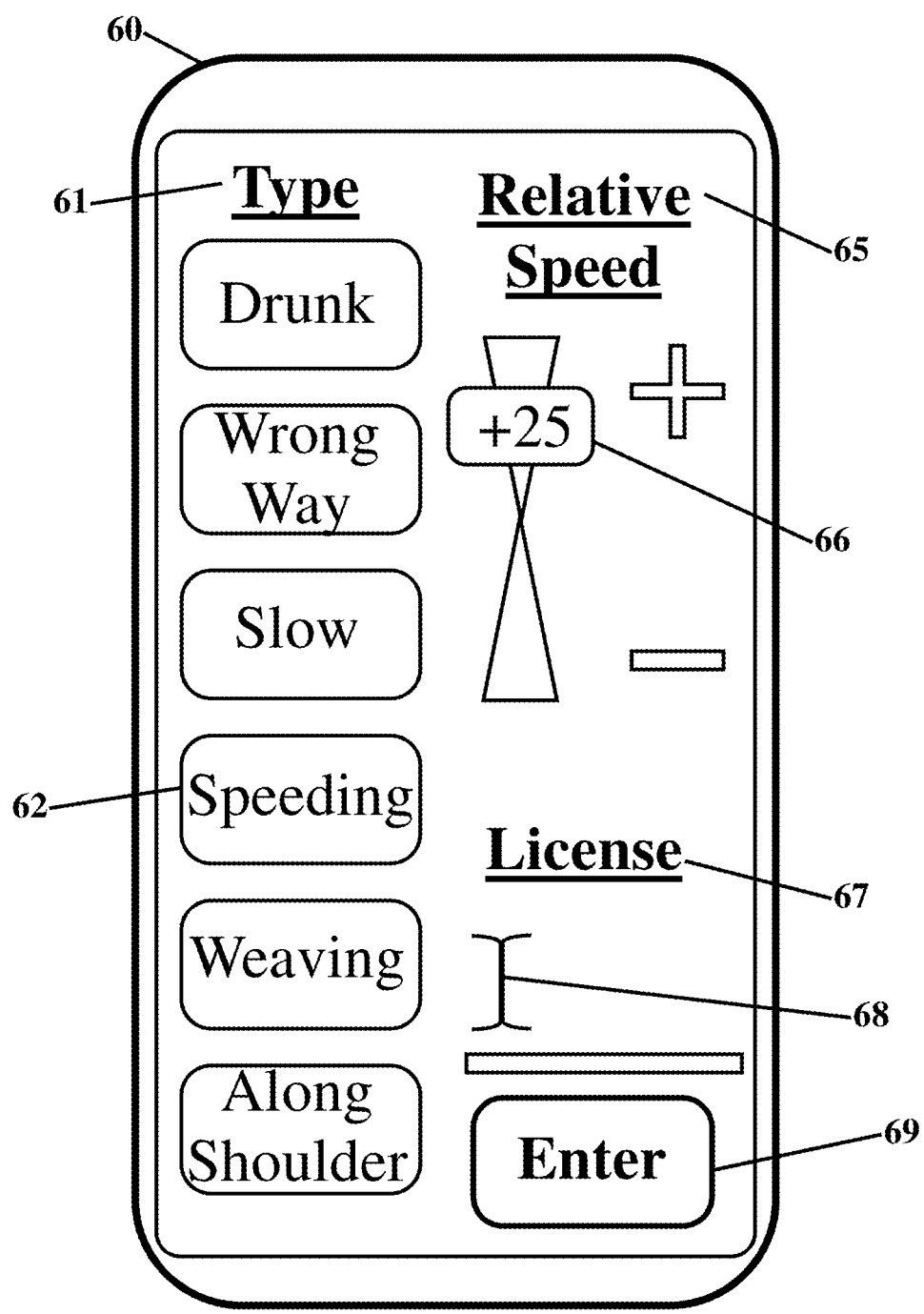
FIG. 3 illustrates an example entry screen for an application for a method operating on a mobile device, according to various embodiments.

FIG. 3 illustrates an example screen 300 that shows a graphical user interface (GUI) provided by an application, according to various embodiments. The screen 300 screen is an example only for reference as a simplified display to enable a user to quickly enter information (e.g., to avoid the user from being overly distracted from the road). In this example, the information may be entered on a mobile device where using available sensors on the mobile device (and/or proximity to base stations or other known objects) the present location, direction of travel, and speed of the mobile device is known. This use of available data apart from user entry/selection can substantially reduce the information that a user needs to enter and/or select. Although the information may be referred to herein as entered, the entry may comprise selecting information, such as selecting an icon such as "speeding" 62. The entries can be aggregated or merged with existing mapping, Global Positioning Satellite (GPS), and other information including information from other sensors the vehicle or mobile device may have. The application for performing the method according to various embodiments can allow an observer to notify others that a hazardous vehicle is in the area or may be approaching other people in danger. In one example, the observer can simply open the application, and with a few selections can enter relevant information into the application as will be explained further below.

In the example shown in FIG. 3, on the screen 300 of the mobile device 60 display for the application, the primary observer 20 can selects the subject vehicle type 61 of subject vehicle 30. For example, the speeding 62 type may be selected. In addition to speeding 62, other types shown in the example GUI include drunk, wrong way, slow, weaving, and along shoulder. Several of the types may be exhibited by a drunk driver. The screen 300 can have a slider for indicating the relative speed 65. As the slider is moved in response to user action, the speed display 66 can show the perceived or relative speed 66 ("+25" in this example). The user action may be a touch, spoken command, and the like. Based upon this information and other acquired information or determinations, the method for the application can predict the direction of travel (e.g., relative to the primary observer 20 or others) and when the subject vehicle 30 may approach other drivers, off ramps and freeway interchanges.

The example application screen 300 may also include an interface for the user to provide vehicle license plate information, e.g., "license" 67. The example screen 300 shows an optional location for entry 69 of the license plate information 68 of the subject vehicle 30. In response to selection of this area by a user by touch or spoken commands, etc., various embodiments will display a keyboard which the user can use to enter the letters, number and symbols for the license plate as well as availability to utilize a devices camera and optical character recognition (OCR) technology to obtain license plate data. In various embodiments, this license plate information can be compared to the state department of motor vehicles accessible database to obtain the owner, color, make and model of the subject vehicle 30. In some cases, the home address, work address, or route may be obtained also by the system to help determine a possible predicted destination for the subject vehicle 30. In some embodiments, the home address, work address, route of subject vehicle 30 or other information obtained, based on the license plate information and other information, including but not limited to facial recognition, may be used to also obtain a business address, and addresses of relatives associated with the subject vehicle 30 or other information useful in determining route or future destination. This information may be referenced to predict potential destinations where the subject vehicle 30 may be heading. In some embodiments, the sensor used may be a camera, and the method can receive a photo of the subject vehicle 30 taken by the primary observer 20 using a mobile device 60's camera(s) or using a camera in the vehicle to capture an image or video of the vehicle license plate number of the subject vehicle 30, and the GUI can provide a portion to support image capture. In other embodiments, a provided user interface (and/or remote sensors) can enable an observer to select descriptive information about the vehicle, including but not limited to make, model and color, which can also be deduced utilizing image recognition technology. In some embodiments, other descriptors for the subject vehicle can be obtained by sensor(s) including, but not limited to, damage, dents, level of cleanliness, stickers, and other aspects that could alone or together with other aspects, be helpful to identify the subject vehicle 30.

In response to actuation of the enter button on the GUI 300 in this example, various embodiments can determine the proximity and potential of another user encountering the subject vehicle 30. In some embodiments, other drivers can setup to be linked to receive alerts (akin to an Amber alert or tornado warning alert) based on inputs from the primary observer 20 and/or remote sensors and determinations made therefrom and from sensor data, to alert the other drivers of particulars about the subject vehicle 30 and the respective likelihood of an encounter for that particular other driver. Various embodiments are particularly helpful if the subject vehicle 30 approaches from behind a vehicle such that the vehicle or driver may not be as cognizant of the moving object. Other drivers can also use the application, and autonomous sensors can confirm presence of and potential for an encounter with the object and provide the system with additional data with which to update information related to the subject vehicle 30 (hazard type of moving object).

FIG. 4 shows an example screen 400, for a device, presented to a user in response to determining that a moving object (hazard) is observed at point 22 and is presently ahead of the user. Various embodiments may present the hazardous object with a moving visual representation of its predicted location along a route between the hazardous object and an alerted user that will be visible within the application. The method may achieve this based on calculating the relative speed/trajectory information by determining a distance and relative position which may be presented at 92 and updated. The example screen 400 can show a series of distance areas 70, in the form of concentric circles or polygons that become increasingly intense based upon the proximity to the object. In some embodiments, a polygon effect is used which equates to a reachable range in any direction over time based on the deduced capabilities of the identified object. The distance areas 70 may be shown in red, or could be a different color based upon the type of object and the weighting of any potential interaction. The color could be customizable by a user or alert provider (i.e., service subscribing entity) depending on their preference. The example screen 400 also provides a prompt 93 to allow for user input to update information on the object that is relayed to the system and can be relayed to other application users and entities receiving data from the service.

FIG. 5 shows an example screen 500, for a device, presented to a user in response to determining a moving object (hazard) is observed at point 22, and is presently to the east of the user or driver 20. The screen 500 shows a series of distance areas that become increasingly intense based upon the proximity to the object. The distance and position of the moving object that is a potential moving hazard may be presented at 92, shown relative to the position of the device that is running the application in accordance with various embodiments. In FIG. 5, the areas 70 may be shown in red for emphasis, but could be a different color based upon the type of object (i.e., type of hazard) and weighting of any potential interaction, with the color customizable by the user or third party service provider. As an example, a drunk driver may be deemed to be greater hazard than a slow moving vehicle. Both moving objects have a potential for danger and unpredictability, but the potential for the drunk driver to weave, get into an accident, and cause injury can be far greater. The screen 500 also provides a prompt 93 to allow for user input to update information on the object that can be relayed to other application users and entities receiving data from the service.

FIG. 6 shows an example screen 600 presented to a user in response to determining that a user (e.g., driver 21) is approaching a moving hazard type of object. In various embodiments, the application (per the corresponding method) collects reports received from multiple drivers and integrates the information to update proximate drivers determined to be potentially affected and also to cancel projected hazard trajectories for users that are determined to be no longer affected. As other drivers add to the information, some projected routes can be cancelled in response to determining that the subject vehicle has changed from one road to another; e.g., changed freeways or exited a freeway. In various embodiments, the warnings generated for providing to other drivers are localized for the subject vehicle's proximity to the hazard and are determined as a function of characteristics of the hazard, e.g., a slow, weaving drunk driver, a wrong way driver, a driver on the shoulder of the road in stopped traffic, motorcycle, fire truck, ambulance or a speeder weaving around drivers to maintain a higher rate of speed, to name just a few examples.

Screen 600 in the example in FIG. 6 shows multiple example moving potential hazards 30-33 in proximity to the driver 21. In various embodiments, each hazard 30-33 type is moving and is identified with a different color code based upon the potential severity of the hazard. For screen 600, the driver 21 is shown approaching a hazard 30 which is along the guided trajectory, that is generated according to the method in various embodiments, because the method determined that the driver 21 needs to pass through the interchange 40 based on the route driver 21 is taking. Screen 600 provides an alert 95 that shows the hazard type and provides instruction to advise the best lane to follow to avoid the hazard based upon information provided by other users. The alert 95 in this example has a prompt to allow the user to tap for more information. It should be noted that, in this example, the method determined that some of the moving potential hazards 31-33 are not in the determined travel path of the driver 21. Although these moving potential hazards 31-33 may have minimal or no effect of the driver 21, the driver (or passenger) may be able to observe the hazards 31-33 so various embodiments allow the user to update or append information related to the hazards. Screen 600 also shows trip information 96 which may include the estimated time that the driver will arrive at their destination, number of miles and amount of travel time. In various embodiments, the determination of the user's destination based will reduce updates on other moving potential hazards 31-33 because it can be determined that those potential hazards are unlikely to affect the travel trajectory that has been determined for the driver 21. Screen 600 also shows at 94, in this example, the upcoming distance to a turn and identifies the turn along the project route of travel.

In various embodiments, the determination of the travel trajectory can be based on the route and destination for the user. The destination can be determined variously, for example, based on navigation system communication, user input/selection, or predicted based on historical data that can show a pattern of having certain destinations at the time and place of the trip, based past destinations for the route taken, based on the user's calendar or other information the user had provided, with different weights given to the information depending on the source of the information, e.g., less weight to destinations based on distant history and more weight to destinations based on the venue for an event on the user's calendar accessible from the mobile device, for instance.

For movement prediction in various embodiments, the form of movement needs to be matched with the polygon representing calculated potential locations within a determined timeframe based on mobility physics of the object For example a person can physically run at maximum measured maximum speed of nearly 28 MPH (e.g., world's fastest runner Usain Bolt in the 100-Meter Sprint). The average vehicle has an average maximum speed of between 100-120 miles per hour. In various embodiments, the method calculates the average maximum speed of an identified object/person/vehicle, along with conditions of the object's terrain and the limited mobility and speed based on same (i.e. hills, pavement condition, curves in road, etc.) and calculates the maximum acceleration rate of a moving object (which could be a person, vehicle, or other object) along with its average calculated maximum speed and adjusts the algorithm in real time using the actual geo-location and relative movement against this algorithm to determine the earliest potential opportunity for an encounter (e.g., with the moving hazard, person, vehicle, etc.,). The algorithm can also adjust estimations in real-time based on all possible locations that the identified object/person/vehicle could have been. This can create a level of awareness for all users that will allow for appropriate preparation of possible encounter.

FIG. 7 shows an example screen 700 presented to a user to route around a potential hazard (in response to determining that the potential hazard was in the route the user had been taking). In various embodiments, the system is configured to provide a database (or other data structure) that can be quickly cycled through to identify specific object type with associated predictive historic traits/trends including statistical movement choices in space as well as known acceleration and speed ability of identified object, e.g., to provide the ultimate alert/warning system.

Additionally, the app can take into consideration, through the app's predictive algorithm and geographic system, the medium an object will move through in time including air/water/space etc. and adjust the maximum acceleration and top speed of maximum reachable range according to the known substance being traversed by the object.

In various embodiments, the application uses traffic patterns and travel times on each street, highway or road, and in addition, tracks moving hazards and moving potential hazards to, alert to the potential hazard type and instructions 95 in FIG. 7 and trip information 96. All known routes of the potential hazardous can be highlighted to further alert the user. While a recent accident may not generate a present delay in traffic speeds, a moving hazard can present different challenges so in various embodiments, a driver 21 that is approaching a hazard 32 along their route, will be re-routed or at a minimum be alerted before they encounter the hazard 32. On screen 700, the hazard is identified by a drink icon; other appropriate icon warnings may be used to identify various hazards.

Figure 8:
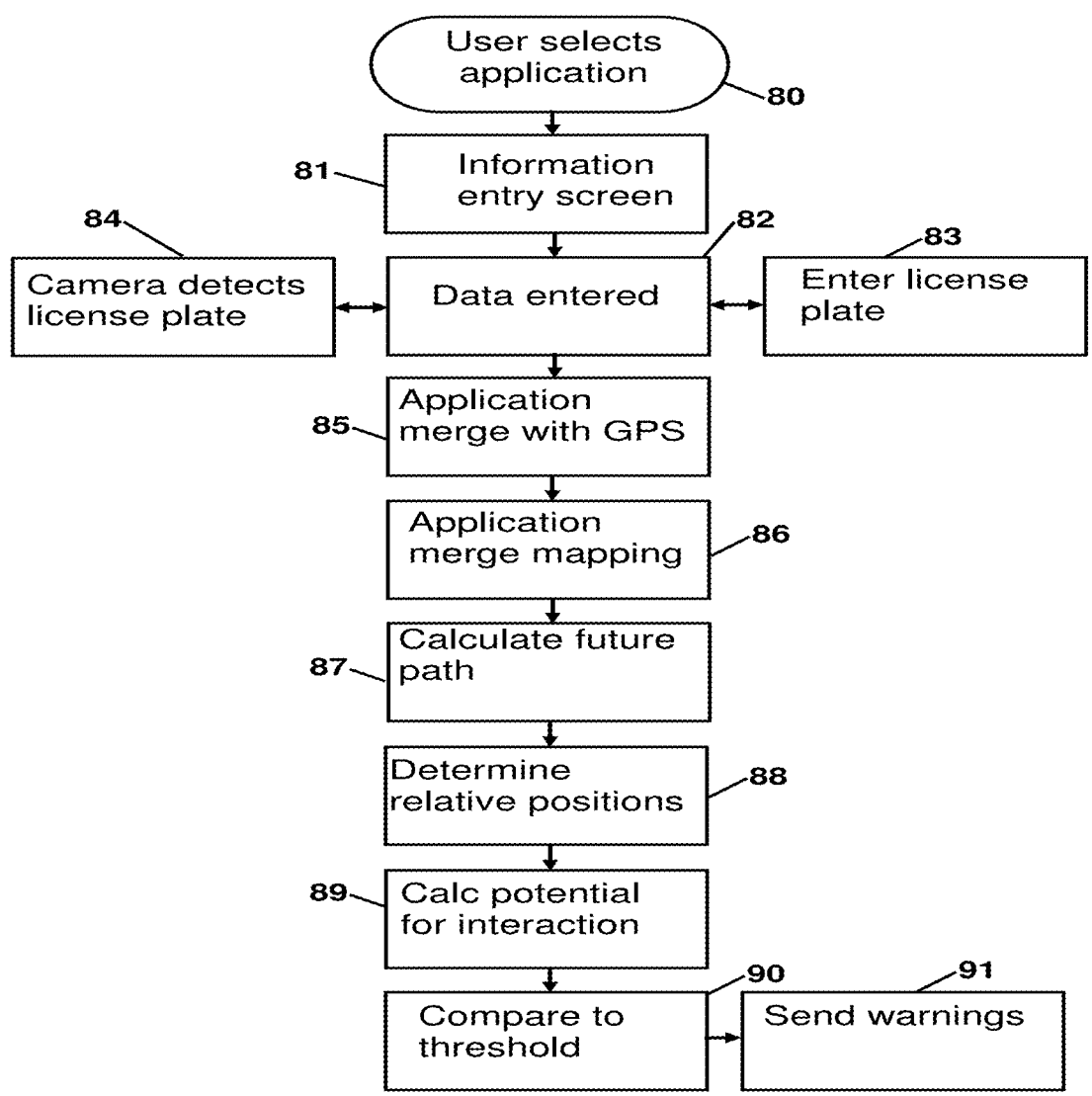
FIG. 8 illustrates a block diagram of an operational flow chart according to some embodiments.

FIG. 8 illustrates a block diagram of an operational flow chart for a method where the hazard is a moving vehicle on a roadway, according to some embodiments. A user selection of the application is received at 80. A warnings-only mode can be provided, whereby the application can run in the background, alerts can be sent and received as notifications, alerts can be sent and received as text messages, or alerts can be sent and received within other applications, providing warnings as determined according to various embodiments described herein. Upon initialization of the program or within application settings options may be presented to the user for selecting the sensitivity for notifications, e.g., selecting various setpoints. For example, at a low level the user has the option to only be notified when a speeder is approaching from the rear at a relatively close distance as determined by various embodiments. The methods and system in various embodiments can also provide the option for the user to select a high level of user notification and specify a distance such that a notification will be generated and sent to the user for any reported moving objects of concern such as, for instance, any reported hazards within that distance of miles (e.g., where the user is driving on an unfamiliar road at night with potential for various unseen objects). Based on additional embodiments, such settings may be determined by a third party subscriber to the system that is providing data to their users and customers.

In some embodiments, the application may be provided to the user on the mobile device or preinstalled on the user's mobile device or within the vehicle, e.g., by an insurance company or the vehicle manufacturer or vehicle owner (other than the driver) who owns or otherwise controls the software for the application. The insurance company, for instance, may want the application settings to have setpoints that are more broad and to allow the application to disable the driver from adjusting those predetermined setpoints.

After initialization of the program and based on selections, if any, of options by the user as permitted or predetermined settings, the application can provide an information entry screen for display to the user, at 81 in FIG. 8. The items on the screen that the user can adjust may vary depending on the options selected. Screen 300 in FIG. 3 shows an example of an information entry screen. At 82 on screen 800, the application allows the user to enter certain data on the information entry screen. The application can received data entered by the user 82 as described herein in various embodiments. While not required, a license plate of the moving object (e.g., of subject vehicle 30 in FIG. 2), for example, can be manually entered at 83 by the user. Alternatively, a sensor may detect the license plate and software, locally or in the cloud, could perform character recognition to ascertain the license plate number. Although a camera is mentioned at 84 as detecting the license plate, the sensor is not limited to a camera, other suitable sensors may be used that are capable of obtaining an image of the license plate or capable of determining the license plate number. The application can allow a driver (e.g., the primary observer 20 in FIG. 2) to take a photo or video of the moving subject vehicle. In addition, images can be taken by remote sensors, dashcams, and the like that are networked and connected to the service.

After the data, such as that shown for example at screen 300 in FIG. 3, is entered, the data can be merged, at 85 in FIG. 8, with GPS information from the mobile device or vehicle. In various embodiments, the mobile device can determine location, direction and speed data for the mobile device and the primary observer 20 in FIG. 2 in the same vehicle, using various sensors.

At 86 in FIG. 8, the data can be merged with mapping programs or applications locally or in the cloud. In various embodiments, the various mergings provide capability that would be otherwise not available to the mapping programs, applications, users, or third party subscribers to the data.

At 87 in FIG. 8, the data can be used, locally or in the cloud, to calculate future path(s) of the subject vehicle 30 in FIG. 2, as described further herein in various embodiments.

At 88 in FIG. 8, the relative positions between the subject vehicle 30 in FIG. 2 and other drivers are determined according to various embodiments. Based at least in part on the distance, potential travel routes, and travel speed of the subject vehicle 30 in FIG. 2, as described in examples herein, the potential for interaction between the drivers and the subject vehicle 30 is calculated, locally or in the cloud, at 89 in FIG. 8. In some embodiments, other users are provided with an image of the subject vehicle 30 which will reduce the amount of input required from those users and allow for a quicker identification and verification of the subject vehicle.

At 90 in the example flowchart 800 in FIG. 8, the application will then compare, locally or in the cloud, the determined potential for interaction with a threshold set for notification to determine the level of notification to provide to the particular user. In response to the potential for interaction being determined to be above the set threshold, at 91, an alert (warning) can be generated for delivery to a subject user, e.g., displayed on the user's mobile device. The application will continue to monitor the moving objects (subject vehicle 30 shown in the examples in FIG. 1 and FIG. 2, and other moving hazards determined to have potential for interaction along the user's route, for example) and compare the potential interaction with the threshold to determine if the alert should continue to be displayed, additional alerts sent, or if the potential for interaction with the object is no longer present.

While in various embodiments a mobile device may be used, some embodiments of the methods and systems for the application may utilize static locations that include traffic cameras, for example, to determine a subject vehicle 30 from FIG. 2 and send notifications to subject users and data subscribers.

In other embodiments, the application can also be used to identify both moving and static objects, or identify a subject vehicle that is emitting moving objects which are hazards such as releasing trash or dropping gravel.

Some embodiments may be used for warning pedestrians of a subject vehicle 30 in FIG. 1 and FIG. 2, or other objects (including persons) approaching. The method and system can provide protection to people walking around a city with a messaging and tracking system. The method and system can connect a tracked network of individuals with others as well as police, when needed for immediate support. In some embodiments, the method and system tracks a user's location amongst their friends and broadcast to their friends or to all people in the immediate surrounding area if a call for help is initiated, for example, for networked 911 system.

In various embodiments, the application uses sensor data to track the speed and direction of the user 20 in FIG. 2 who is inputting the data using the application, and based at least in part on that sensor data (which may include variously accelerometer data, gyrometer data, GPS data, Wi-Fi data, other radio data, and other user provided data), the application can determine the relative speed of the identified subject vehicle to project and calculate all possible trajectories of the identified subject vehicle 30 in FIG. 2 over an adjustable setpoint of time. As also described above, the license plate or other data identifying the subject vehicle 30 may be used to determine potential destinations for the subject vehicle 30 and to determine projected routes and how such routes might potential intersect with that of the system users.

Moving object predictive locating reporting, and alerting for other types of objects besides unsafe drivers within the scope of the present technology and described further herein.

FIG. 9 illustrates example entry screens 900, 910, and 920 for an application, according to other embodiments. Example screen 900 is an introductory screen shown to a user in response to the application being started. Screen 910 shows options for "Report Hazard" and "Hazards Nearby", in various embodiments. In response to the selection of "Report Hazards", screen 920 may be displayed which provides the option for the user to select "Record Description" using audio and/or video, or to "Enter By Hand" for the user to manually enter.

Some embodiments provide users and other sources with the option to include audio, video, virtual reality systems, inputs from remote networks through sensors and photos as part of their reports; enable voice reports from the user to include in-depth information; and parse audio and video reports using artificial intelligence separately or together with human monitors.

FIG. 10 illustrates an example screen 1000 providing a user interface to record a description for reporting a hazard, according to various embodiments. In response to selection of the "Record Description" option on screen 900, screen 1000 may be presented to the user to select initiation of an audio recording to report a hazard. In various embodiments, in response to selection of the "Record" button, the user may be prompted with the following audio: "Please speak clearly. Do not take any action that might be dangerous. Please include the type of hazard, including color and model of any vehicles, the speed and direction they are traveling, and what you observe to be the hazard. Please begin recording after the tone." The present technology is not limited to this particular wording of the prompt; other suitable audio prompts may be used in some embodiments. In response to detecting that the user has completed the recording, screen 1010 may be presented to the user. Screen 1010 provides after recording, "Submit," "Playback," "Re-record", and "Delete" options, in some embodiment.

FIG. 11 illustrates three example screens 1100, 1110, and 1120 for alerts providing to the user overlaid on a map, according to an example embodiment. Screen 1100 can provide selections for Speeding, Swerving, Distracted, Aggressive, and Slow, along with a Submit button, to characterize the other driver where multiple selections may be made. Screen 1110 is presented to the user to provide for entry of more information ("info") such as, in this example, License, Make/Model, Color, Speed, and Direction for the other vehicle, that can be submitted using the Submit selection. Screen 1120 can be presented to the user to provide a voice audio input default after selecting each of the options shown in screens 1100, for example to speak the license number, and text input if the user desires.

FIG. 12, FIG. 13, and FIG. 14 illustrate example screens and icons for examples of report of alerts provided to a user. For each screen, the user is prompted to confirm "See This Hazard" regarding the hazard identified by one of the icons on the screen, according to various embodiments.

FIG. 12 illustrates three example screens 1200, 1210, and 1220 for alerts provided to the user overlaid on a map, according to an example embodiment. In example screen 1200, a moving object hazard report location is depicted along with route the moving object hazard is calculated to take towards a subject user driving in the same direction as, and ahead of the object hazard. Also, in this embodiment example a zone or region depicting the most likely current location of the object hazard is shown as distinct, using an alternate or more intense graphic or color and which may include a representative icon. In example embodiment 1200 the most likely current location of the object hazard is behind the subject user's vehicle. In addition, 1200 illustrates example icons that may be used. In example screen 1210, a moving object hazard report location is depicted along with route the moving object hazard is calculated to take when driving in the same direction as a subject user, and when driving ahead of the subject user and when the subject user is located behind the object hazard's previously reported location. In this embodiment example zones or regions depicting the most likely current locations of the object hazard is shown as distinct, using an alternate or more intense graphic or color, and which may include a representative icon. In example embodiment 1210 the most likely current locations of the object hazard are ahead of the subject user's vehicle. In example screen 1220, a moving object hazard previously reported location is depicted along with route the moving object hazard is calculated to take when driving in the same direction as a subject user, and when it is predicted to be driving ahead of the subject user, and when the subject user is located ahead of the object hazard's previously reported location. In this embodiment example zones or regions depicting the most likely current locations of the object hazard is shown as distinct, using an alternate or more intense graphic or color, and which may include a representative icon. In example embodiment 1220 the most likely current locations of the object hazard are ahead of the subject user's vehicle. In example screen 1230, a moving object hazard previously reported location is depicted [insert arrow/number as necessary] along with route the moving object hazard is calculated to take when driving in the same direction as a subject user and if on the same route as the subject user, and when it is predicted to be driving ahead of the subject user, and when the subject user is located ahead of the object hazard's previously reported location. In this embodiment example, routes the moving object hazard may have taken, but which the subject user has not traveled, are not depicted and only the routes the subject user may take and which may be taken by the moving object hazard are displayed. Zones or regions depicting the most likely current locations of the object hazard are shown as distinct, using an alternate or more intense graphic or color, and which may include a representative icon. In example embodiment 1230 the most likely current locations of the object hazard are ahead of the subject user's vehicle.

FIG. 13 illustrates two more example screens 1300 and 1310 for alerts provided to the user overlaid on a map, according to an example embodiment. In example screen 1300, a moving object hazard report location is depicted along with route the moving object hazard is calculated to take when if driving towards a subject user that is traveling towards the moving object hazard. In this embodiment example the zones or regions depicting the most likely current locations of the moving object hazard are not shown since it's calculated that the moving object hazard would be beyond the subject user's vehicle. In example embodiment 1300 the most likely current locations of the object hazard are behind the subject user's vehicle. In example screen 1310, a moving object hazard report location is depicted along with route the moving object hazard is calculated to take towards a subject user driving in the same direction as, and ahead of the object hazard. In this embodiment example the zones or regions depicting the most likely current locations of the moving object hazard are not shown since it is calculated that the moving object hazard would be beyond the subject user's vehicle. In example embodiment 1310 the most likely current locations of the object hazard are ahead of the subject user's vehicle.

FIG. 14 illustrates two additional example screens 1400 and 1410 for alerts provided to the user overlaid on a map, according to an example embodiment. In example screen 1400, a moving object hazard report location is depicted along with route the moving object hazard is calculated to take towards a subject user driving in the opposite direction and heading towards a moving object hazard (in this example moving object hazard is calculated to be headed north and subject user is calculated to be heading south). Also, in this embodiment example a zone or region depicting the most likely current location of the object hazard is shown as distinct, using an alternate or more intense graphic or color and which may include a representative icon. In example embodiment 1400 the most likely current location of the object hazard is ahead of the subject user's vehicle and between the subject user's vehicle and the previously reported moving object hazard location. In example screen 1410, a moving object hazard report location is depicted along with route the moving object hazard is calculated to take if driving the same direction as a subject user that is traveling towards the moving object hazard's previously reported location. Zones or regions depicting the most likely current location of the object hazard are shown as distinct, using an alternate or more intense graphic or color, and which may include a representative icon. In example embodiment 1410 the most likely current location of the object hazard is ahead of the subject user's vehicle.

Amber alerts may be provided in various embodiments. Such alerts are critical and are directed to locate and report kidnappers of missing children. The U.S. Department of Justice has estimated that nearly 800,000 children are reported missing every year. The National Center for Missing and Exploited Children estimates that 203,000 children are kidnapped each year by family members. As an example of this embodiment, upon the received report of a kidnapped child, a user such as law enforcement could identify the reported location of the abduction and view a timestamped area on a map, including polygons with all potential locations the perpetrator is calculated to be able to travel based on the current time, as well as into the future. This example embodiment provides potential locations the child and perpetrator(s) have been, may be, and will be. Additionally, if the reported child or child abductor is identified by and reported by another application user, person calling into 911 or a similar service, or by sensor(s), automated or manually operated, data could be updated and the additional report can aid the system in triangulating and more accurately predicting the abductor and the child's actual position.

The map views, for example in FIGS. 4-7 and 12-14 may include a polyline/route drawn from the hazard to the user's current location which calculates how far an object or hazard can move in time based on their maximum known movement capacity. If the user moves off the route, the current route map may or may not be updated in various embodiments. Alternatively, new routes can be determined and the map and alerts can be generated based on new routes and any additional data obtained on objects with respect to the new route.

FIG. 15 illustrates two example screens 1500 and 1510 for providing amber alert notifications and information to a user, according to an example embodiment. Screen 1500 is an "Amber Alert Notification" example screen. Similar notification screens for other alert types can utilize this method. Screen 1510 is an example screen that provides an "Amber Alert Info" option for users to report a sighting. The "Report This" selection causes initiation of the report section of the application, as described further herein. Additionally, Amber Alerts may be depicted in any of the forms described and depicted for other moving objects, and in ways not depicted herein. Amber Alert data, predicted locations, and other information also may be consumed by third party subscribers to the data.

Alerts may be in the form of push notifications, an API alert, or server-side alerts, and the like. Users within a range (e.g., an area which may have two or three dimensions in the present technology, referred to herein as a polygon for examples of two dimensional areas) of a reported object will receive a push notification in some embodiments. The polygon can be global with the report occurring based on a user's last known location. An example initial range could be 30 miles. A user may only see hazard reports in range. Without adding the background services, notifications can be sent based, for example, on a user's location, or more recent known location within a timeframe.

As described herein, reports concerning various objects can be received by many users and sources which can be used by various embodiments as crowdsourcing inputs for the moving object predictive locating, reporting, and alerting aspects.

Various embodiments provide segmenting of objects by categories, and provide for transmitting appropriate information to law enforcement for particular objects. In various embodiments, the method does not disturb or alert users outside the object range to avoid being the high tech equivalent of the "the boy who cried wolf". There are numerous other use cases and embodiments for other types of moving objects and the unique challenges each can present.

For example, drones or other automated sensing devices can be used to monitor and/or identify a moving object and take various actions. In some embodiment, one or more drones are launched in response to a report of a moving object. Drones can be launched from other moving vehicles, from stationary stored locations, or from roving vehicles tasked to follow tagged objects. The moving object can be detected by the drone(s), (e.g., based on the initial report with descriptors), reported, tagged and followed. Some embodiments provide a unique identifier for any target moving object; use a network of available sensors from moving vehicles, fixed points, IoT device, etc.; and deliver data to a central system for later identification and tracking. This system may be cloud-based and could be decentralized for increased security and capability. In some embodiments, reports from users and sensors are monitored to help combat false positives. Additionally, the weighting effect of multiple reports of the same moving object in a limited area over time can help combat false positives. If only one report of the moving object is received, it may be less weighted compared to the multiple reports.

Exemplary methods include a system for real-time tracking using, for examples, drones and/or networked sensor technology. In some embodiments, drones or other sensor carrying devices (hard mounted or mobile—including law enforcement vehicles and autonomous vehicles) identify and image targets using sensors such as photo, laser, lidar, infrared, radar, sonic, etc. to identify a target's unique identity (e.g., turning objects into their own QR codes, in essence) so other networked sensor systems can help recognize and update target location and other target deltas to the central system.

In some embodiments, the method can calculate the movement of an object in any predictable direction based on the movement range and characteristics of that object, including rate of acceleration and range of speed. Such embodiments may aid, for example, in the tracking of drones that could pose a danger to passenger aircraft, vehicles, or people.

Various embodiments are based on the speed of a relative vehicle at the time detection was made. The following may be considerations for the speed determination: real time traffic patterns; speed limit of roadway/street; speed of user reporting hazard, rate of acceleration, speed range of object's make and model. Rate of acceleration and speed can be sensed with updated data from sensors, from users reporting hazard/object; and based on calculations using known maximum acceleration and maximum top speed of hazard/object. As used herein, roadway describes any road which could be a freeway, expressway, highway, ramp, street, passageway, service road, alley, avenue, boulevard, turnpike, autobahn, motorway, dirt roads, gravel, and other types of roads.

In some embodiments, the map drawings and route information, other than the information related to the hazards and other objects, predictive locating, reporting and alerting described herein, may be based, at least in part, on commercially available map information. In that regard, in various embodiments, a hazard reporter module sends the hazard (or other object) report to a server (or other computer on which a portion of the computing power for executing the method may reside). The report can include one or more of the latitude/longitude (lat/lng) coordinates of the reporter vehicle and, if any was recorded, a voice file. The method may calculate a polygon from the reported location, look up users reporting within that polygon within a certain number of minutes (e.g., 30 minutes for instance). The method initiates the sending of alerts (e.g., push notifications) to all users meeting the above criteria. The method may generate an application programming interface (API) request to a map server for route from hazard (or other object) report lat/lng to current alerted user lat/lng. The method configures the user interface for the alerted user to displays a map with their location, the hazard (or other object) reported location, and an animated polyline running from the hazard (or other object) reported location to the user's current location.

In some embodiments, the method running in the application may make an API request to a map server that includes a request for all primary roadways within a certain travelable timeframe from the hazard (or other object) report. The method initiates a display on the user interface of the alerted user to display highlighted primary roadways for all locations the hazard (or other object) may have traveled within that time frame. In some embodiments, this can include displaying polygons of a potentially traveled area within a timeframe, and displaying polylines for all primary roadways between the polygons.

In some embodiments, an identification feature is provided within the method that locates the position of wanted persons based on various information. For "Most Wanted" persons or escaped prisoners, for example, the reachable range can be calculated based on information from sensors and other data, to provide alerts of potential threats that could potentially affect a user. For example, someone or sensors may identify a subject, report to the system, and in response, the system determines and generates possible locations/range that subject may have traveled within time constraints. All known locations and possible past positions can be made available to responding officers in all zones based on time and trajectory. Using the information and/or the application, officers can easily keep track of each other as well as all associated and needed supporting agencies including Fire/Hospitals/News Agencies/coast guard/military. In various embodiments, voice recognition capabilities are provided across all needed networks. These agencies will be fortified with the present technology due to additional access to civilian reporting to harness the power of crowdsourcing, according to various embodiments. Such embodiments, may be used in cases of assault victims and attempted or actual theft, burglary, robbery, human trafficking, runaway children reported by parents and last-seen reports, to name several non-limiting examples.

Some embodiments provide integration with various other apps, for example, for hiking, scuba diving, to name just a few, regarding various hazards (or other objects) that may be encountered during those activities and for responding to the same.

For hiking app integration, for instance, the method may track hikers, mountain bikers, rock climbers, ice climbers, etc. The method may detect a rock climbing fall, general fall, or other hazardous movement and have a "life alert" two way communication if a person is disabled from a fall. If there is no response from climber or hiker to an alert, the method can alert others (where "others" as used herein may include people, robots (e.g. "robot doctors"), autonomous vehicles, drones, and the like) in the area with location information to provide help for the injured person. Other kinds of problems that may occur on the hiking trail albeit a sprained ankle, dehydration, lost, etc. could also be reported. In addition, the presence of dangerous animals could be detected by various embodiments or reported by other, including the presence of bears, rattlesnakes, mountain lions, etc. The last known location of such moving hazards (or other objects) could be sent to authorities, rangers, and hikers in the area.

Internet access might not be readily available along a trail, so in some embodiments, point to point app communication capability is provided such that a chain of people using the application can send data from person to person (and ultimately through the Internet or cellular communication if one person in the chain/mesh has connection to such sources or a satellite phone) in case of emergency or for convenience when technology becomes available. The method may provide an area highlighted on the user interface showing where the hazard (or other object) could have been and presents that information for a timeframe. The amount of time may be user-selectable or predetermined by the system based on various factors, including type of moving object hazard, or by third party subscribers to the system.

In other embodiments, the method provides the option to have people report "harmless" animals such as deer, owls, eagles, etc. for birdwatchers, for fun and/or for photo opportunities. The method could, based on the movement determined from sensors and/or reports, determine how busy a trail is based on monitoring trail traffic. In some embodiments, the method can detect people running in panic and use that information to alert users of possible danger.

In some embodiments, alerts can be generated concerning dangerous weather including movement, for example, flash floods, storms, mudslides, tornadoes, wind, snow, rain, earthquakes, etc. Other reports and alerts could concern water contamination due to, for example, red tide, chemical spills, etc. and could include alerting all appropriate authorities.

In some embodiments, the present technology may be utilized by a pedestrian that observes a hazard (or other object) to warn others, e.g., hazard (or other object) being a vehicle driving on a sidewalk, heading to the sidewalk, etc. In other embodiments, the system can utilize built-in pedometer and accelerometer functionality in the mobile device to confirm if a person is actually walking instead of driving slow or cycling slow. The technology can additionally utilize the mobile device's (e.g., cell phone's) or utilized device's accelerometer and/or gyroscope.

For scuba diving, for example, the method can be used to detect based on sensors/reports that sharks in the area and other dangers and report same to users.

In other embodiments, the system may predict the outward potential movement of an individual in a vehicle, on foot, using mass transit, or using an electric bike (e-bike), an electric scooter (e-scooter), or any other forms of transportation.

In some embodiments, military uses may be provided to protect and network soldiers from enemy combatant threats in all possible forms whether it be soldiers, vehicles, drones, ballistics, etc. In any location, the method and system may track the outward movement of an identified soldier on foot and how fast they could move in any and all locations based on the fastest rate of speed of a human on foot. Various embodiments can provide multiple projections based on the ability of the object. For example, the system can provide three projections/reachable range polygons based on the ability for a combatant soldier to change his/her method of movement. For example, a person may change quickly from running to driving to flying. All these scenarios can be calculated and filtered for considering by the receiver.

The method and system, based on its determinations, can confirm the earliest possible time of encounter as well as all possible locations of the opposing force within a polygon in its outward movement prediction capability through reachable range technology based on movement through time. This can help all surrounding friendly forces know the earliest possible encounter time frame or location for strategic preparation. In some embodiments, our forces can use the information from an analytics perspective for all needed scenarios.

Insurance companies can see an immediate metric and reduction in claims, once the present technology is paired with their services. Customers could then be more aware of hazards (or other objects) and will have the ability to maneuver around known hazards (or other objects), which should reduce accidents and insurance costs, for example.

Autonomous self-driving vehicles can benefit from the present technology as it will allow networked vehicles to better detect moving hazards (or other objects) to increase their ability to protect the passengers, additionally passengers can generate hazard (or other object) reports which can be added to the autonomous self-driving vehicles network.

FIG. 16 is a simplified flow diagram of an example method, according to some embodiments, with further details described herein.

Step 1602 is optional, as indicated by the dashed line, and includes providing a user interface to a user for information entry on a device, as described further herein.

Step 1604 includes receiving (optionally via the user interface), moving object data corresponding to a moving object, as described further herein.

Step 1606 includes, receiving sensor data from a sensor, as described further herein.

Step 1608 includes merging the received moving object data and the received sensor data into a set of merged data, as described further herein.

Step 1610 includes based on the merged data set, automatically determining one or more of: a predicted location for the moving object, a potential path of travel for the moving object, a potential for interaction between the moving object and one or more other objects, and an alert concerning the moving object, as described further herein.

Step 1612 includes providing the alert, as described further herein.

In some embodiments, the present technology is a system (and corresponding method) that provides a service where third parties are providing inputs and those third parties or others are receiving outputs from the system. Inputs could include all types of sensor data pertaining to users and moving objects (e.g., that could be classified as hazards), and third party consumption of both that same data as well as receiving outputs from the system The outputs received by the third party provider could include additional information generated by the system pertaining to predictions determined concerning, but not limited to, approximation and estimation of future location, proximity, trajectory and routing.

For one non-limiting example, the method can further include providing the merged data set to a third party provider, e.g., for generating a predicted location for the moving hazard (or other object), at least one potential path of travel for the moving hazard (or other object), and/or a potential for interaction between the first user and the moving hazard (or other object), and for generating and transmitting an alert.

Figure 17:
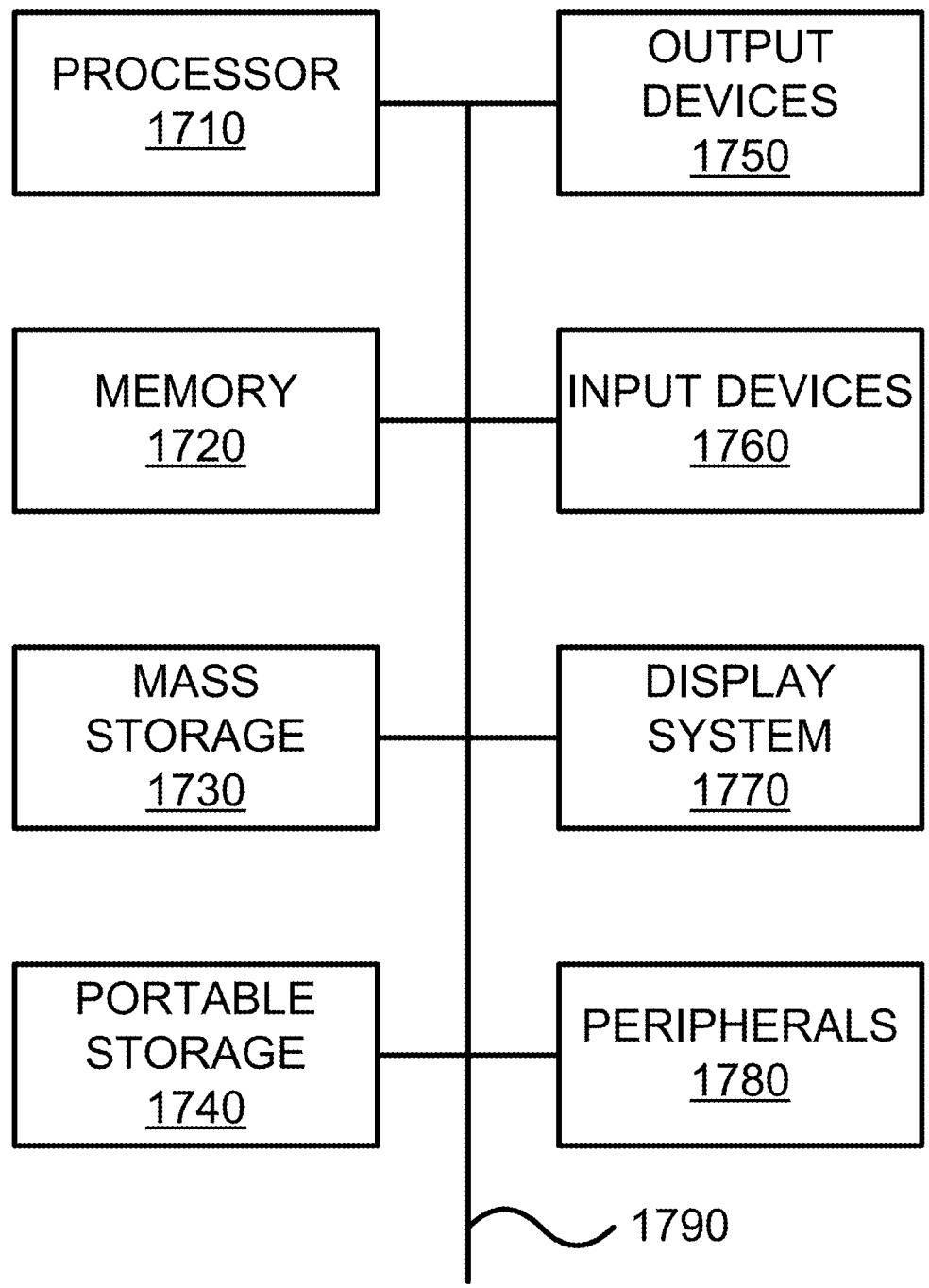
FIG. 17 is a simplified block diagram of a computing system, according to some embodiments.

FIG. 17 illustrates an exemplary computer system 1700 that may be used to implement some embodiments of the present invention. The computer system 1700 in FIG. 17 may be implemented in the contexts of the likes of computing systems, networks, servers, or combinations thereof. The computer system 1700 in FIG. 17 includes one or more processor unit(s) 1710 and main memory 1720. Main memory 1720 stores, in part, instructions and data for execution by processor unit(s) 1710. Main memory 1720 stores the executable code when in operation, in this example. The computer system 1700 in FIG. 17 further includes a mass data storage 1730, portable storage device 1740, output devices 1750, user input devices 1760, a graphics display system 1770, and peripheral device(s) 1780.

The components shown in FIG. 17 are depicted as being connected via a single bus 1790. The components may be connected through one or more data transport means. Processor unit(s) 1710 and main memory 1720 are connected via a local microprocessor bus, and the mass data storage 1730, peripheral device(s) 1780, portable storage device 1740, and graphics display system 1770 are connected via one or more input/output (I/O) buses.

Mass data storage 1730, which can be implemented with a magnetic disk drive, solid state drive, or an optical disk drive, is a non-volatile storage device for storing data and instructions for use by processor unit(s) 1710. Mass data storage 1730 stores the system software for implementing embodiments of the present disclosure for purposes of loading that software into main memory 1720.

Portable storage device 1740 operates in conjunction with a portable non-volatile storage medium, such as a flash drive, floppy disk, compact disk, digital video disc, or Universal Serial Bus (USB) storage device, to input and output data and code to and from the computer system 1700 in FIG. 17. The system software for implementing embodiments of the present disclosure is stored on such a portable medium and input to the computer system 1700 via the portable storage device 1740.

User input devices 1760 can provide a portion of a user interface. User input devices 1760 may include one or more microphones, an alphanumeric keypad, such as a keyboard, for inputting alphanumeric and other information, or a pointing device, such as a mouse, a trackball, stylus, or cursor direction keys. User input devices 1760 can also include a touchscreen. Additionally, the computer system 1700 as shown in FIG. 17 includes output devices 1750. Suitable output devices 1750 include speakers, printers, network interfaces, and monitors.

Graphics display system 1770 include a liquid crystal display (LCD) or other suitable display device. Graphics display system 1770 is configurable to receive textual and graphical information and processes the information for output to the display device.

Peripheral device(s) 1780 may include any type of computer support device to add additional functionality to the computer system.

Some of the components provided in the computer system 1700 in FIG. 17 can be those typically found in computer systems that may be suitable for use with embodiments of the present disclosure and are intended to represent a broad category of such computer components. Thus, the computer system 1700 in FIG. 17 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1700 may be implemented as a cloud-based computing environment, such as a virtual machine operating within a computing cloud. In other embodiments, the computing system 1700 may itself include a cloud-based computing environment, where the functionalities of the computing system 1700 are executed in a distributed fashion. Thus, the computing system 1700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, e.g., optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, e.g., a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Figure 18:
FIG. 18 illustrates another example embodiment showing the moving object polygon and some information regarding the moving object and report of same, according to various embodiments.

FIG. 18 illustrates an example embodiment 1800 showing the moving object polygon (e.g., reachable range) and other information regarding the moving object and report of same, according to various embodiments. The example in FIG. 18 illustrates how various embodiments can use "reachable range" to help determine a moving object's (e.g., moving hazard's (or other object's) proximity and a trajectory required to reach a location or target. In some embodiments, the polygons in FIG. 18 would replace the concentric circles shown in the examples in FIG. 3 and FIG. 4. Multiple polygons may be drawn radiating out from a hazard (or other object) report location, with each polygon depicting a timeframe from the report taking into consideration speed, traffic, roadways, and other variables, the most outward polygon representing the range that an object can reach based on its known maximum speed, road conditions, speed limits, and acceleration capabilities, etc. The inner polygon represents a variable potential minimum range of speed based on similar parameters. In this example, distance from the alert reported location is displayed, the encounter estimated time is displayed based on the object's known maximum speed, road conditions, speed limits, and acceleration capabilities, etc., and the hazard (or other object) report time reflected as minutes ago is displayed, which all could be displayed along with the map, polygons, routes, and identifying icons for the subject user and moving object's location or range of predicted locations.

Figure 19:
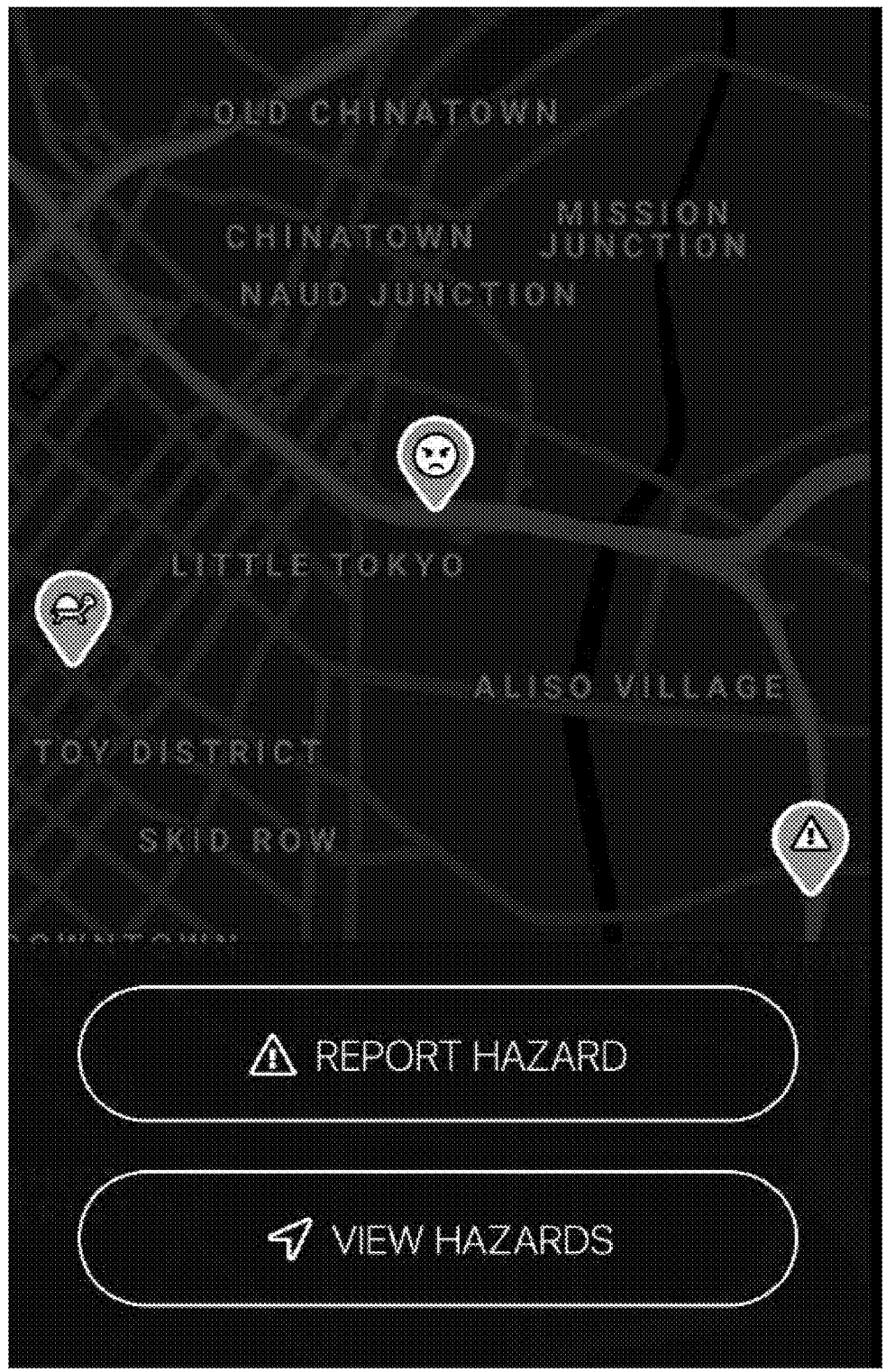
FIG. 19 illustrates another example embodiment of a screen in FIG. 9 for reporting and viewing hazards and other objects.

FIG. 19 illustrates another example embodiment 1900, of a screen 910 in FIG. 9, and FIG. 6, for reporting and viewing hazards (or other objects).

Figure 20:
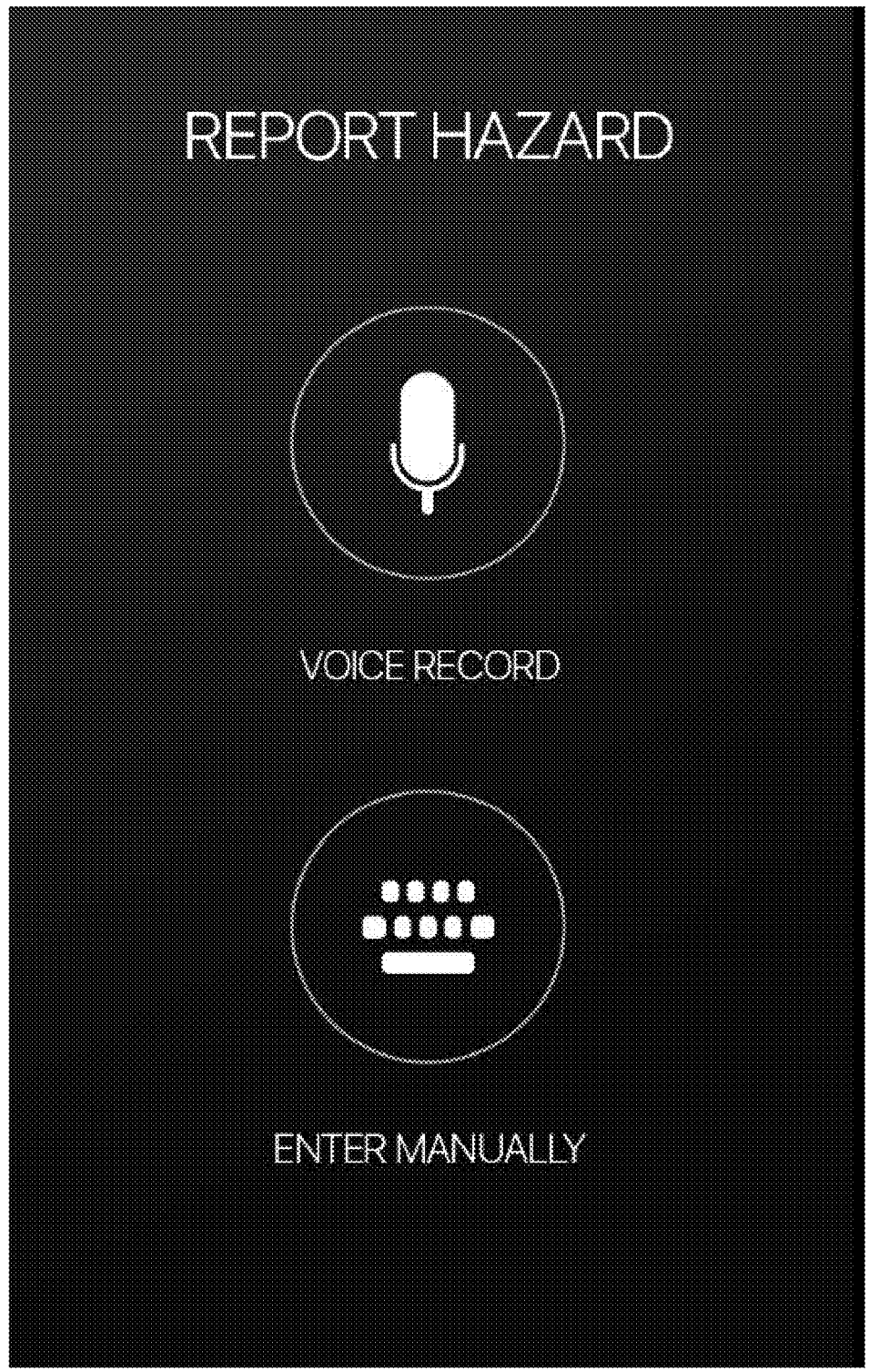
FIG. 20 illustrates another example embodiment of a screen in FIG. 9 for selecting voice recording or manual entering of hazard reports.

FIG. 20 illustrates another example embodiment 2000, of a screen 920 in FIG. 9, for selecting voice recording or manual entering of hazard (or other object) reports.

Figure 21:
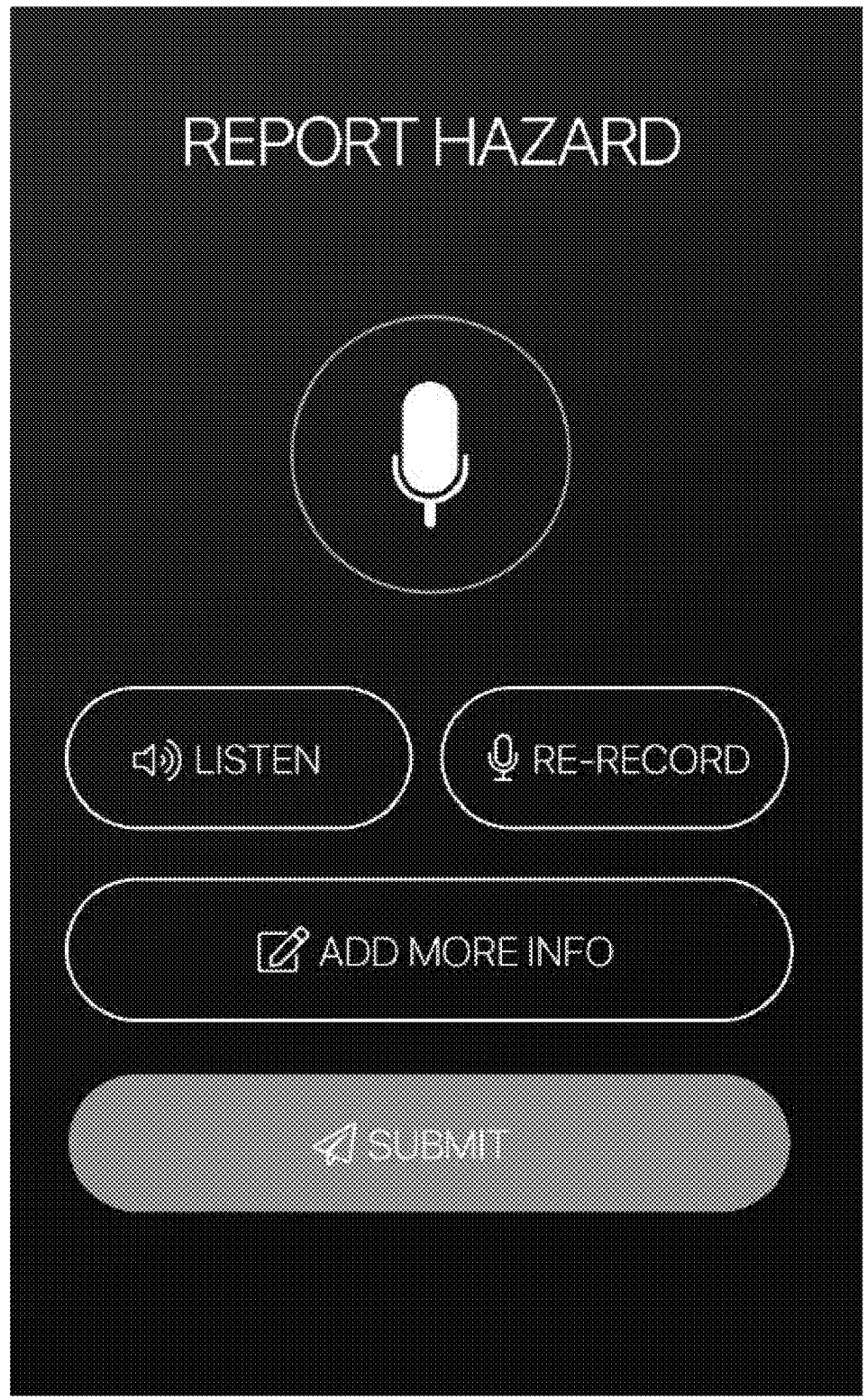
FIG. 21 illustrates another example embodiment of the screens in FIG. 9 for audio reporting of hazards and other objects.

FIG. 21 illustrates another example embodiment 2100, of the screen 1010 in FIG. 10, for audio reporting of hazards (or other objects). In this example, screen 2100 has selections to start recording (e.g., microphone symbol), to listen, to re-record, to add more info, and to submit.

Figure 22:
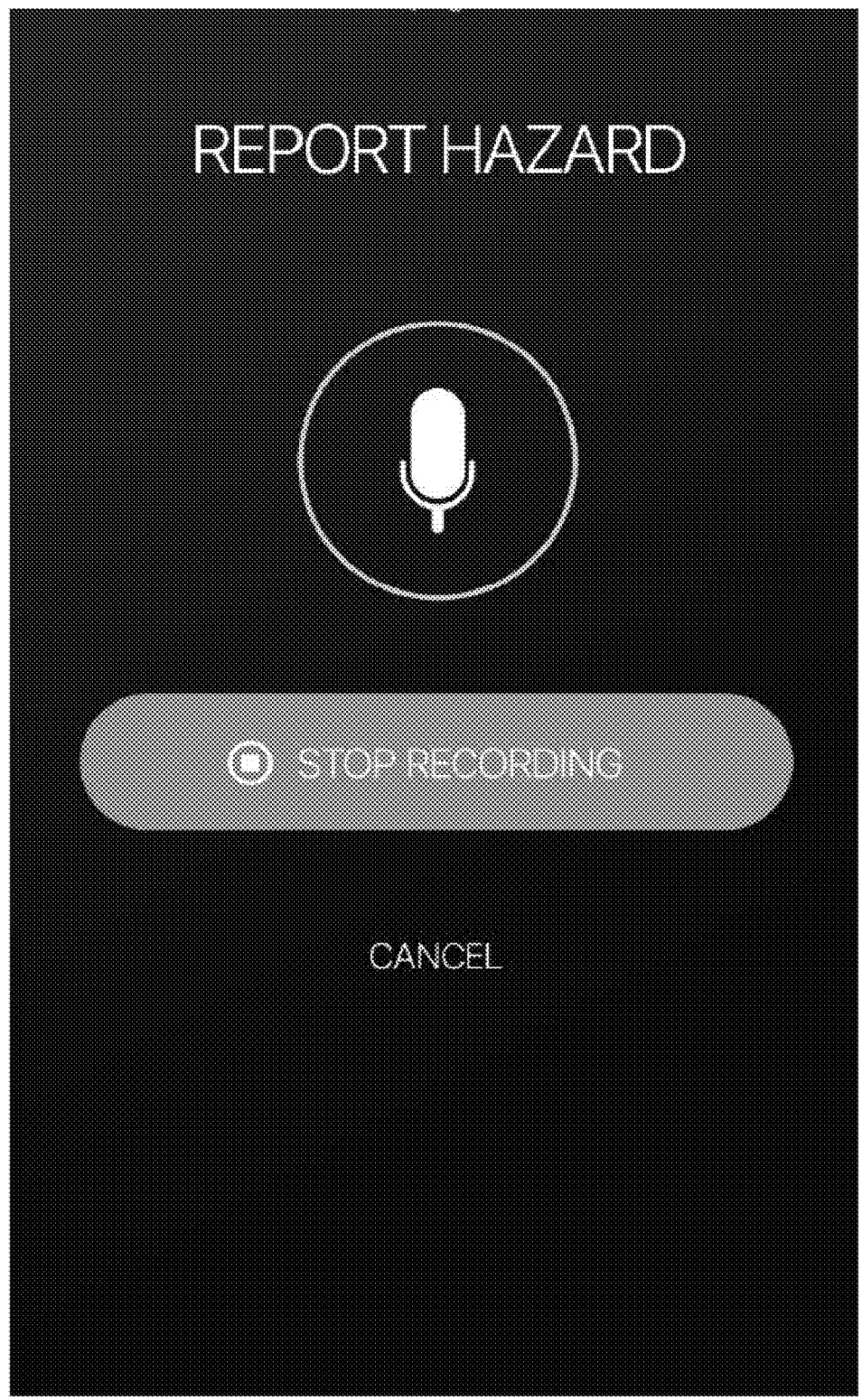
FIG. 22 illustrates an additional simpler example embodiment of a screen for audio reporting of hazards.

FIG. 22 illustrates another example embodiment 2200, of the screen 1000 in FIG. 10, for audio reporting of hazards (or other objects). Screen 2200 includes a microphone symbol, a selection to stop recording, and a cancel option.

Figure 23:
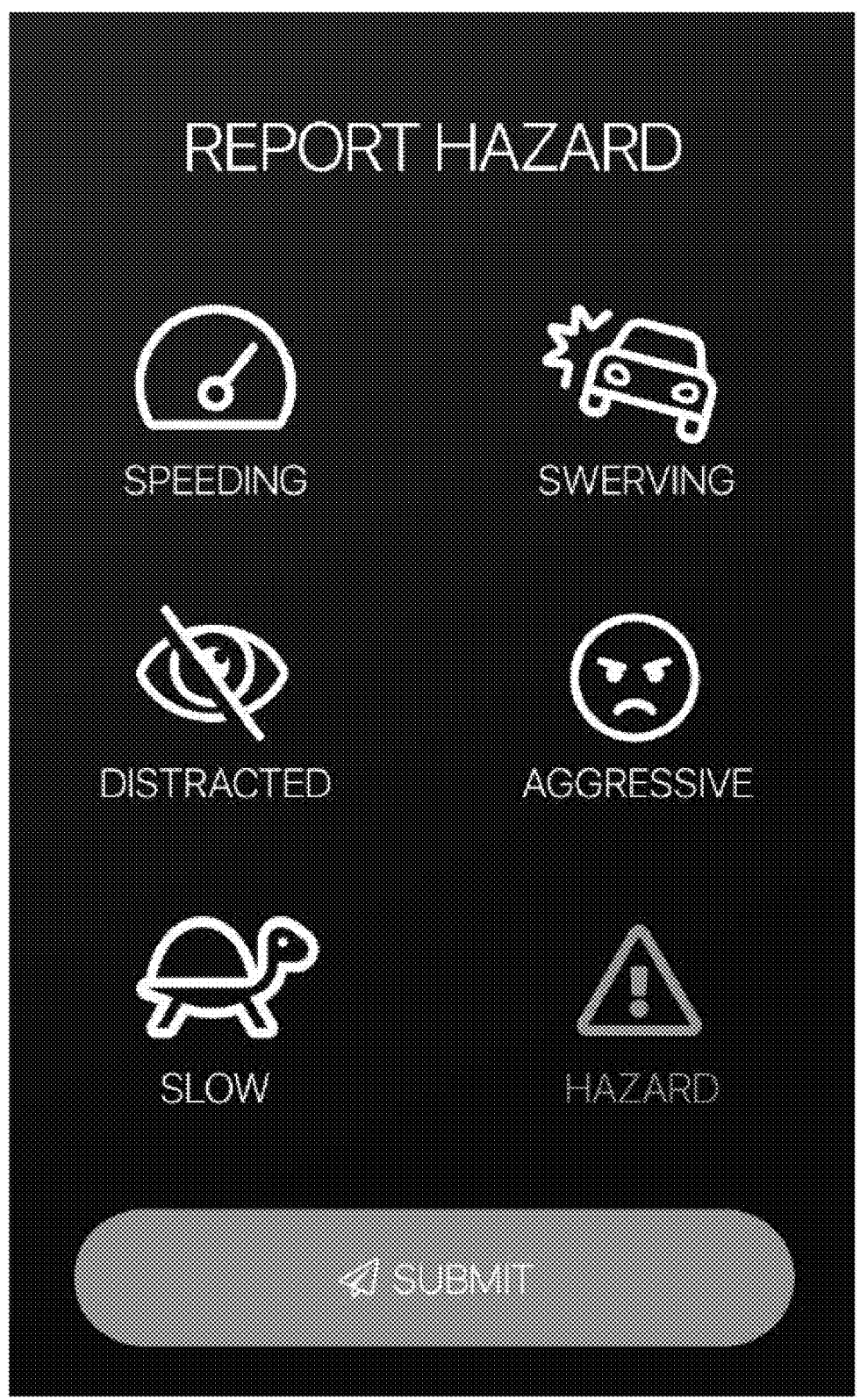
FIG. 23 illustrates an example screen providing a user interface for selection of an icon for reporting characteristics a moving object, according to various embodiments.

FIG. 23 illustrates another example embodiment 2300, of the screen 1100 in FIG. 11, providing a user interface for selection of an icon for reporting characteristics a moving object, according to various embodiments. Using the screen in FIG. 23, a user may report that a hazard (or other object) was variously speeding, distracted, swerving, aggressive, slow, etc.

Figure 24:
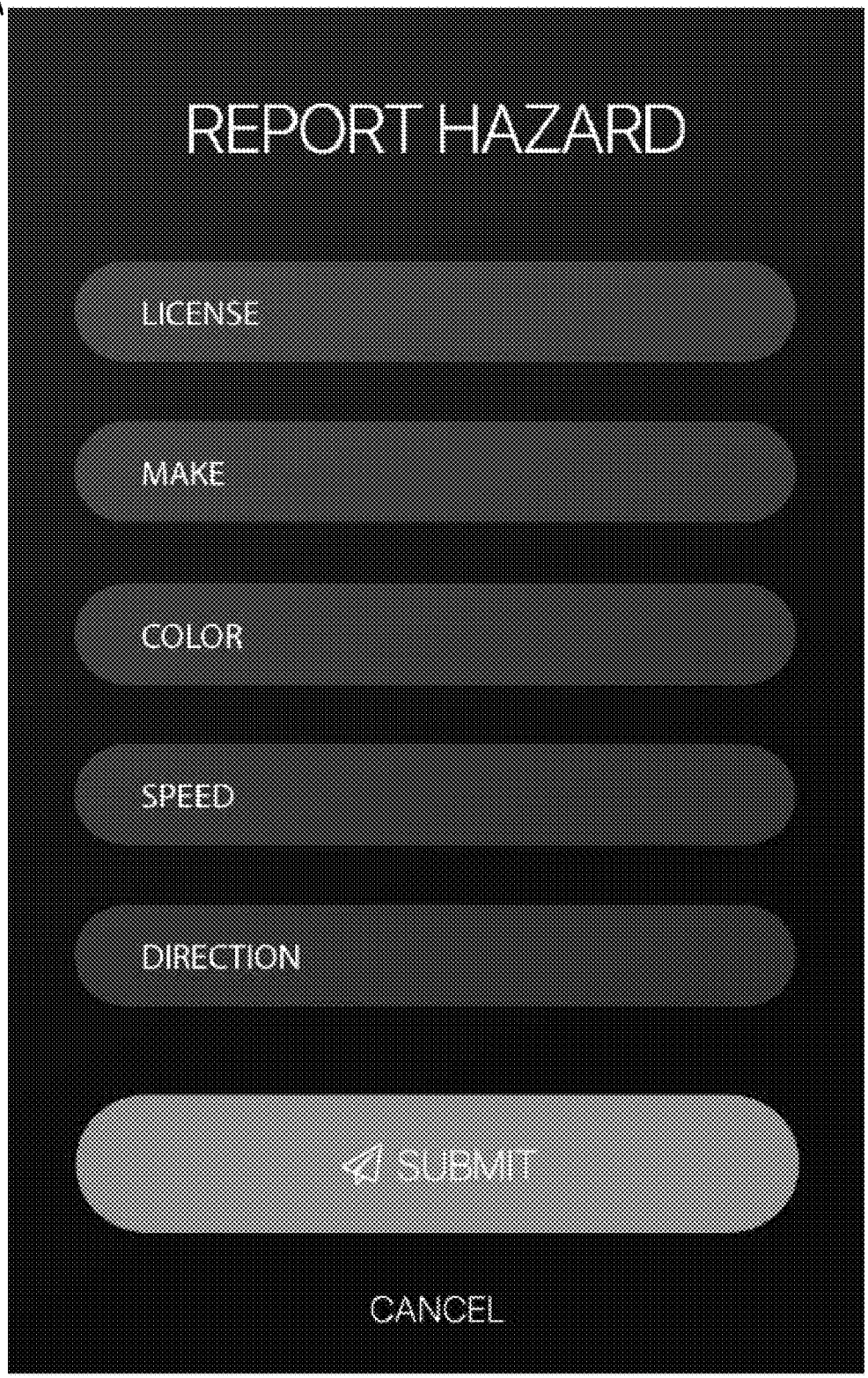
FIG. 24 illustrates another example embodiment of a screen in FIG. 11 for providing identification information about a moving object.

FIG. 24 illustrates another example embodiment 2400, of screen 1110 in FIG. 11, for providing identification information about a moving hazard (or other object). Using this screen, a user may input variously license, make, color, speed, and direction of a moving hazard (or other object) vehicle, akin to a screen 1110 in the example embodiment in FIG. 11.

Figure 25:
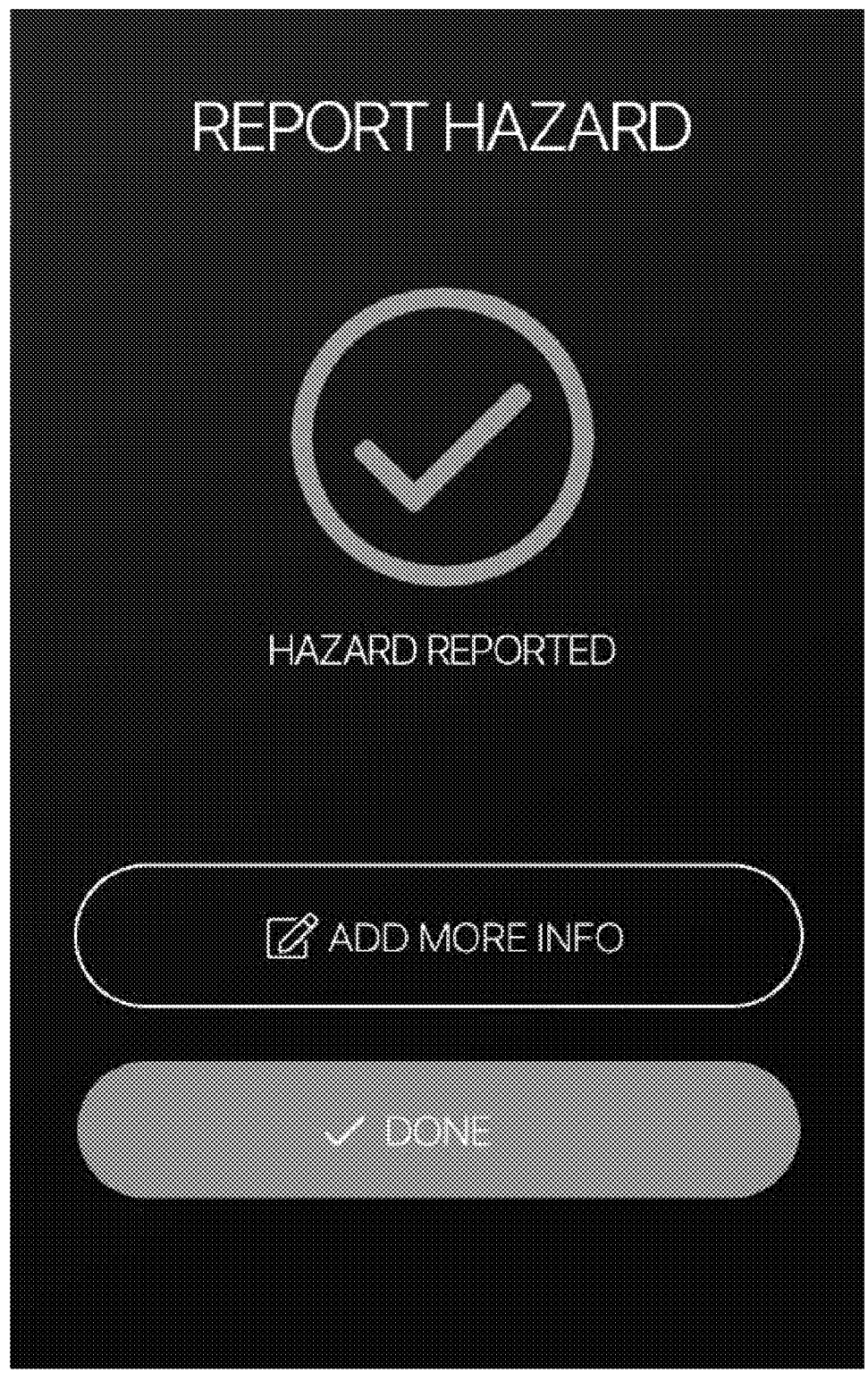
FIG. 25 illustrates another example embodiment of a screen for providing more information about a moving object.

FIG. 25 illustrates another example embodiment 2500 of a screen confirming a sent moving object hazard report, and allowing user to provide more information about the same moving object hazard (or other object). This example shows confirmation that the hazard (or other object) is reported and allows for the addition of more info.

Figure 26:
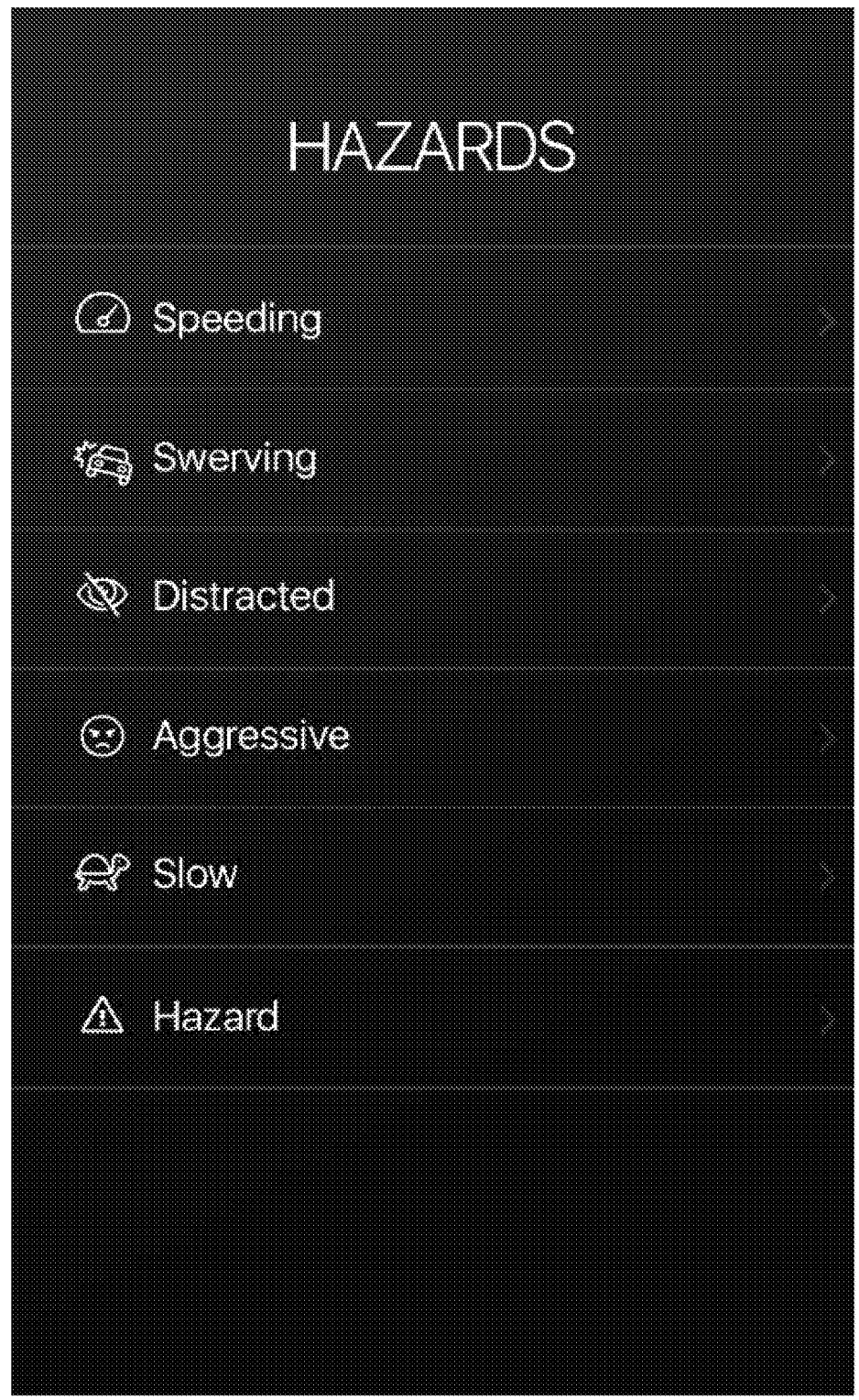
FIG. 26 illustrates another example embodiment of a screen in FIG. 23 for selecting characteristics of the moving object.

FIG. 26 illustrates an example embodiment of a list of the moving hazards (or other objects), along with type of moving object hazard and which may include additional available information such as report time, report minutes ago, report location, predicted location, estimated time of encounter, etc., and allowing a user to select a moving object hazard in order to view more information and data on a map view. In the example in FIG. 26, the characteristics to be selected are shown with text and icons with one per row on the screen which may enable easier access by a driver, for instance.

Figure 27:
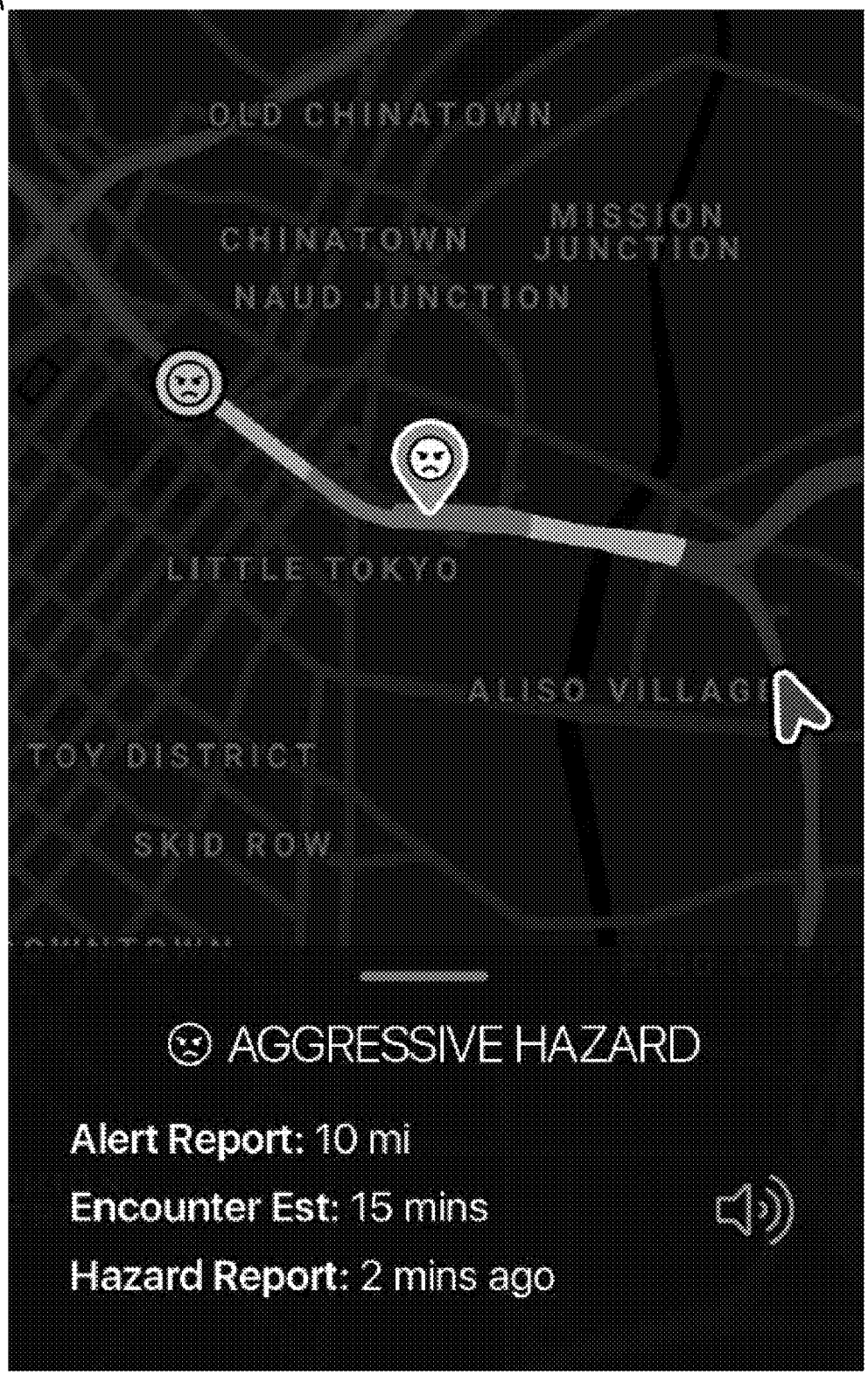
FIG. 27 illustrates an example embodiment of a screen for displaying status information about a moving object.

FIG. 27 illustrates an example embodiment 2700, of screen 1400 in FIG. 14, for displaying status information about an aggressive moving hazard (or other object). The status information may include regarding an aggressive hazard (or other object), the distance from an alert report, estimated time to encounter, and how long ago the hazard (or other object) report was made.

Figure 28:
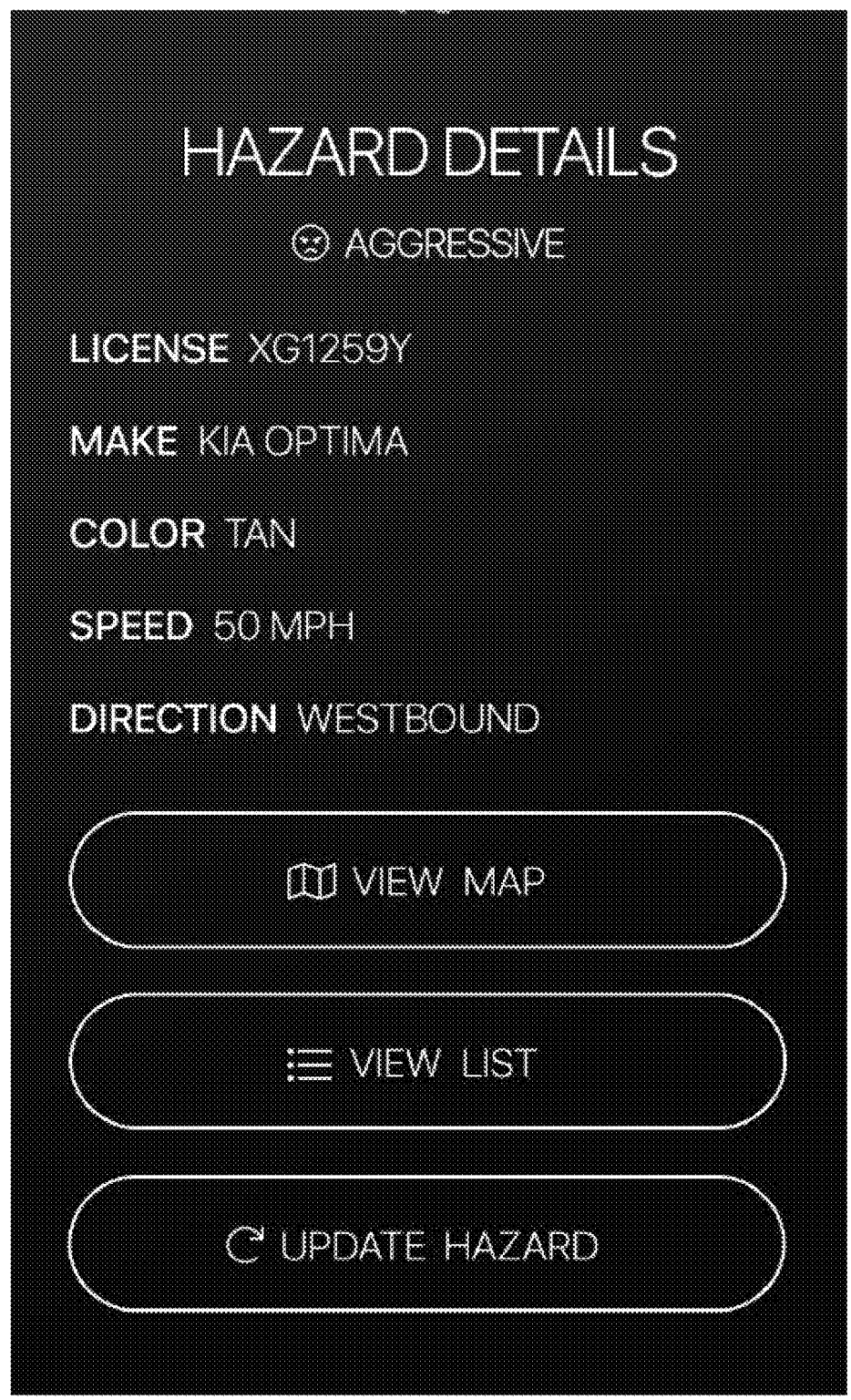
FIG. 28 illustrates an example embodiment of a screen for displaying identifying information about a moving object (in this case a road hazard driving aggressively) and enabling viewing of a map or list or doing an update concerning the moving hazard.

FIG. 28 illustrates an example embodiment of a screen for displaying identifying information about a moving hazard (or other object), in this example an aggressive driver, and enabling viewing of a map or list or proving an update concerning the moving hazard (or other object).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for moving object predictive locating, reporting, and alerting, the computer-implemented method comprising:
    a primary observer manually entering data into an application on a mobile cellular device corresponding to a moving impaired driver subject vehicle;
    said data including an entered direction of travel for said impaired driver subject vehicle into said application on said mobile cellular device;
    receiving a primary observer Global Positioning Satellite (GPS) data and a report time from a location of said primary observer from said mobile cellular device;
    merging the entered moving impaired driver subject vehicle said data and the received primary observer Global Positioning Satellite (GPS) data and said report time into a set of merged data;
    based on the set of merged data, determining by calculating an area from the predicted location or range of locations for the moving impaired driver subject vehicle;
    a predicted location or range of locations for the moving impaired driver subject vehicle, a potential path of travel for the moving impaired driver subject vehicle;
    at least one driver located at a driver Global Positioning Satellite (GPS) location;
    comparing said driver Global Positioning Satellite (GPS) location with said potential path of travel for said moving impaired driver subject vehicle with a driver threshold for notification for interaction with said moving impaired driver subject vehicle;
    said threshold for notification for interaction is a distance between said observer Global Positioning Satellite location with a calculated path of travel and speed of said moving impaired driver subject vehicle and a time between observing said moving impaired driver subject vehicle and a timeframe for level of notification that is set by said drive, and
    a server sending a push notification alert to said driver based upon said driver threshold for notification when said driver is within said timeframe for level of notification along with a report time that indicates how long ago said moving impaired driver subject vehicle was reported.

2. The computer-implemented method of claim 1, further comprising receiving at least some of the moving impaired driver subject vehicle data from at least a secondary observer into at least a second mobile cellular devices.

3. The computer-implemented method of claim 1, wherein the area comprises a reachable range and is configured as a two- dimensional area or a three-dimensional area.

4. The computer-implemented method of claim 3, wherein the reachable range is a function of means of movement of the moving impaired driver subject vehicle and a medium on or in which the movable object is traveling.

5. The computer-implemented method of claim 1, wherein the moving impaired driver subject vehicle exhibits certain behavior determined to be indicative of a drunk driver's vehicle, a texting driver's vehicle, an otherwise impaired driver's vehicle, a kidnapper of missing children's vehicle, an enemy combatant, an enemy combatant's vehicle, or a dangerous animal.

6. The computer-implemented method of claim 1, further comprising configuring the alert for transmission via a push notification, API alert, or server-side alert.

7. The computer-implemented method of claim 1, wherein the potential path of travel for the moving impaired driver subject vehicle comprises at least one route determined in part based on data from a map server.

8. The computer-implemented method of claim 1, further comprising providing to the at least one driver, the predicted location of the moving impaired driver subject vehicle and at least one potential path of travel, both overlaid on a map and configured for display for the driver.

9. The computer-implemented method of claim 1, wherein the application provides for the entry, of the information about the moving impaired driver subject vehicle, via selection and entry of text.

10. The computer-implemented method of claim 1, wherein the application provides for the entry, of the information about the moving impaired driver subject vehicle, via audio input or video input, the method further comprising parsing the audio or video using artificial intelligence or humans or a combination thereof.

11. The computer-implemented method of claim 1, wherein the data further includes information entry selected from a group comprising of at least one of license plate number, Make/Model, Color, and Speed.

12. The computer-implemented method of claim 1, wherein the determining is based at least in part on machine learning or other artificial intelligence processes for learning and predicting based on historically observed habits and statistics.

13. The computer-implemented method of claim 1, wherein the method is configured to be utilized via a web browser, a corporate network server, a cloud-based provider.

14. The computer-implemented method of claim 1, further comprising:
   identifying a vehicle license plate for the moving impaired driver subject vehicle;
   receiving historical traits and trends associated with the moving impaired driver subject vehicle, including statistical movement characteristics of the moving impaired driver subject vehicle, the statistical movement characteristics including acceleration and speed ability of the moving impaired driver subject vehicle; and
   adjusting the maximum acceleration, top speed, and maximum reachable range for the moving impaired driver subject vehicle as a function of geographic mediums that the object will move through in time over the projected course and trajectory of the moving impaired driver subject vehicle.

15. The computer-implemented method of claim 1, wherein the threshold is a distance of said driver from said moving impaired driver subject vehicle.

16. The computer-implemented method of claim 15, wherein the threshold also includes at least one of a speed of said moving impaired driver subject vehicle, a speed of said driver and a direction of travel of said driver and a destination of said driver.

17. The computer-implemented method of claim 1, wherein the information entry is a vehicle license plate number and matching the license plate number to known to at least one of a home address, a business address, a work address, a relative and a related associate with the moving impaired driver subject vehicle to determine the potential path of travel for the moving impaired driver subject vehicle.

* * * * *